United States Patent
Rhodes et al.

(10) Patent No.: US 8,046,328 B2
(45) Date of Patent: Oct. 25, 2011

(54) SECURE PRE-CACHING THROUGH LOCAL SUPERDISTRIBUTION AND KEY EXCHANGE

(75) Inventors: Bradley J. Rhodes, Mountain View, CA (US); Stephen R Savitzky, San Jose, CA (US); Kurt Piersol, Campbell, CA (US)

(73) Assignee: Ricoh Company, Ltd., Tokyo (JP)

( * ) Notice: Subject to any disclaimer, the term of this patent is extended or adjusted under 35 U.S.C. 154(b) by 1005 days.

(21) Appl. No.: 11/731,623

(22) Filed: Mar. 30, 2007

(65) Prior Publication Data

US 2009/0327729 A1    Dec. 31, 2009

(51) Int. Cl.
G06F 13/14 (2006.01)

(52) U.S. Cl. ............................ 707/622; 707/698

(58) Field of Classification Search ........... 707/999.205, 707/999.203, E17.008, E17.01, 610, 622, 707/698
See application file for complete search history.

(56) References Cited

U.S. PATENT DOCUMENTS

| | | | |
|---|---|---|---|
| 6,154,543 A | 11/2000 | Baltzley | |
| 6,405,315 B1 | 6/2002 | Burns et al. | |
| 6,446,092 B1 | 9/2002 | Sutter | |
| 6,446,093 B2 * | 9/2002 | Tabuchi | 715/255 |
| 6,738,907 B1 | 5/2004 | Carter | |
| 6,760,843 B1 | 7/2004 | Carter | |
| 7,010,689 B1 | 3/2006 | Matyas, Jr. et al. | |
| 7,519,652 B2 * | 4/2009 | Page et al. | 709/201 |
| 2002/0087547 A1 * | 7/2002 | Kausik et al. | 707/10 |
| 2003/0046560 A1 | 3/2003 | Inomata et al. | |
| 2003/0120685 A1 | 6/2003 | Duncombe et al. | |
| 2003/0172089 A1 | 9/2003 | Douceur et al. | |
| 2004/0064693 A1 | 4/2004 | Pabla et al. | |
| 2004/0146164 A1 | 7/2004 | Jonas et al. | |
| 2005/0086384 A1 * | 4/2005 | Ernst | 709/248 |
| 2005/0114686 A1 | 5/2005 | Ball et al. | |
| 2005/0276416 A1 | 12/2005 | Zhu et al. | |
| 2006/0047977 A1 | 3/2006 | Hanasaki | |
| 2006/0129495 A1 | 6/2006 | Okamoto | |
| 2006/0288210 A1 * | 12/2006 | Hansen | 713/168 |
| 2007/0030999 A1 * | 2/2007 | Hyakutake et al. | 382/100 |
| 2007/0056034 A1 * | 3/2007 | Fernstrom | 726/20 |
| 2008/0063207 A1 | 3/2008 | Borza | |
| 2008/0189440 A1 * | 8/2008 | Goyal et al. | 709/248 |
| 2009/0006378 A1 * | 1/2009 | Houle | 707/5 |
| 2009/0060201 A1 | 3/2009 | Rhodes et al. | |

(Continued)

FOREIGN PATENT DOCUMENTS

EP    0715243 A1    6/1996

(Continued)

OTHER PUBLICATIONS

European Search Report for European Application No. 09156826.1-2212, dated Mar. 23, 2010, 9 pages.

(Continued)

*Primary Examiner* — James Trujillo
*Assistant Examiner* — Soheila Davanlou
(74) *Attorney, Agent, or Firm* — Kilpatrick Townsend & Stockton LLP

(57) ABSTRACT

A distributed peer-to-peer document archival system provides the version-control, security, access control, linking among stored documents and remote access to documents usually associated with centralized storage systems while still providing the simplicity, personalization and robustness to network outages associated with personal and peer-to-peer storage systems.

29 Claims, 21 Drawing Sheets

U.S. PATENT DOCUMENTS

| | | | |
|---|---|---|---|
| 2009/0282081 A1* | 11/2009 | Kamvar et al. | 707/104.1 |
| 2011/0010453 A1 | 1/2011 | Roy | |
| 2011/0010541 A1 | 1/2011 | Robert et al. | |

FOREIGN PATENT DOCUMENTS

| | | | |
|---|---|---|---|
| EP | 1158410 A1 | 11/2001 | |
| EP | 1 246 061 A2 | 10/2002 | |
| EP | 1378812 A2 | 1/2004 | |
| EP | 1553557 A1 | 7/2005 | |
| EP | 1 246 061 A3 | 12/2007 | |
| EP | 1975835 A1 | 10/2008 | |
| WO | WO 99/33219 A | 7/1999 | |
| WO | WO 01/52473 A1 | 7/2001 | |
| WO | WO 2005/055022 A1 | 6/2005 | |
| WO | WO 2007/091002 A1 | 8/2007 | |

OTHER PUBLICATIONS

"DRM Architecture, Candidate Version 2.0—Jul. 15, 2004," published by Open Mobile Alliance Ltd. (2004).

"DRM Specification Approved Version 2.0 Mar. 3, 2006," published by Open Mobile Alliance (2006).

"Implementation Best Practices for OMA DRM v1.0 protected MIDIlets, version 1.0," published May 5, 2004.

"Mac OS X Security Services," Developer Connection, May 2006.

"PasswordSafe Frequently Asked Questions," Jan. 1998.

"SplashID Product Descritpion," Jan. 20, 2000.

"SSK: Signed Subspace Key," Apr. 2006, 10 pagers downloaded from http://wiki.freenetproject.org/FreenetSSKPages on May 22, 2007.

U.S. Appl. No. 12/060,048, filed Mar. 31, 2008, Rhoades et al.

Communication of Jul. 16, 2008 with Search Report of Jul. 7, 2008 in European application No. 08251124.7-2212.

European Search Report for European Application No. 09156826.1-2212, dated Jul. 3, 2009, 5 pages.

"A git core tutorial for developers," 27 pages, last updated Sep. 14, 2006.

Back, A., "Eternity Service," *Phrack Magazine*, 7(51), article 12 (1997).

"BitTorrent.org," product description and instructions, 5 pages published by BitTorrent.org (2006).

Clarke et al., "Protecting Free Expression Online with Freenet," *IEEE Internet Computing*, pp. 40-49, Jan./Feb. 2002.

"FAQ, Mnet FAQ v1.3.4," 6 pages, printed Mar. 7, 2007.

Kay et al., "What Lies Ahead," *Byte*, Jan. 1989, 2 pages.

Rhea et al., "Pond: the OceanStore Prototype," *Proc. 2nd USENIX Conf. File and Storage Technologies (FAST '03)*, pp. 1-10 (Mar. 2003).

Roundy, D., "Darcs 1.0.8 (release)," pp. 1-110 (Jun. 16, 2006).

"SSK: Signed Subspace Key," 1 page.

"USK: Updateable Subspace Key," 3 pages, printed Mar. 7, 2007.

Non-Final Office Action for U.S. Appl. No. 12/060,048, mailed on Apr. 19, 2011, 17 pages.

* cited by examiner

Retrieve Document Path

Retrieve Feed Path

Handle New Server Join

Handle Server Removed

Import Hash URI

Service GET BLOB QUEUE

Process New Blob

Service PUT BLOB QUEUE

Service GET FEED QUEUE

Process New Feed Entry

Service PUT FEED ENTRY QUEUE

Push Blob-ID

Clean Up Queues

User Login

Publish File

Publish Directory

Create New Feed

Publish Feed Entry

SECURE PRE-CACHING THROUGH LOCAL SUPERDISTRIBUTION AND KEY EXCHANGE

BACKGROUND OF THE INVENTION

The present invention relates generally to document archiving and document distribution, and in particular to a distributed secure peer-to-peer document archival system.

In a typical business workgroup IT infrastructure, two basic functions must be provided. The first is to insure that team members are able to access their documents and share them with other members. The second is to insure that no one else can access those documents. The first function typically requires a dedicated file server, centralized backups, dedicated network, static IP address and domain name service, the second requires firewalls, account and password management, and physical security for one's servers. Even when membership of a team is clearly defined and relatively static, such an infrastructure is difficult and expensive for a small business to maintain. It is even more difficult when a team is made up of members from several different organizations, and who might collaborate in some areas and compete in others.

Current document archive systems tend to follow one of two models:

The groupware model provides features that are especially useful to a single work group, company or other well-defined group of collaborators that wish to maintain a "group memory." These features include remote access to documents, restricted access for non-group members, security, version control, and unique handles for documents to allow both linking and the creation of compound documents. Groupware systems are most often provided by centralized architectures such as file servers and Web-based content managers.

Conversely, the personal archive model has features to support the mobile, distributed and loose-knit organizations that are becoming increasingly prevalent in today's business world. Knowledge workers in these environments tend to work on many projects at once, and simultaneously belong to many overlapping (and potentially competing) communities. They are also increasingly mobile, and often find themselves in environments with slow, partitioned or no network access. Knowledge workers in these environments need a sharable personal archive: one that is easy for a single person to maintain, works both on- and off-line and supports an intuitive limited-publication model that allows an ad-hoc working group to share some pieces of information while keeping others confidential. These features all suggest a decentralized solution where each user maintains his or her own archive and shares certain files with others, as is provided today by PDAs, locally-stored email archives and traditional paper-based documents.

From a user's perspective, the main difference between the centralized and decentralized solution is whether control naturally lies with the publisher or the reader of a document. On the Web, the publisher of a site (or his designated site administrator) has ultimate control and responsibility over who has access to a document, who can modify it and whether past versions are made available. The publisher may also decide to take a site down entirely, thus denying access to everyone. With email and paper-based solutions, it is the reader who has control. Anyone who receives a paper document has the ability to share it with someone else simply by making a photocopy, and once someone receives a paper document it is very difficult for the original author to "take it back." Similarly, email is often forwarded to others, sometimes with modifications or annotations made by the person doing the forwarding. The decision to grant or deny access to a document is distributed among those who already have access, with limitations imposed through social (and sometimes legal) rules.

Whether publisher or reader control is "better" depends on the organization, the environment in which the information is being produced and used, and sometimes on who is doing the judging. Centralized solutions such as password-and-firewall-protected Web servers work well in environments where there are clearly-defined groups of people who need access to clearly-defined sets of documents, and where there is a clear distinction between authors and consumers of information. In more collaborative environments where group boundaries are fuzzier a distributed solution is often better. Most workers today fall somewhere between these two environments, engaging in both ongoing and ad-hoc collaborations, and thus need the advantages of both centralized and decentralized systems.

BRIEF SUMMARY OF THE INVENTION

A personal document archive system according to the present invention provides for secure publication of compound documents to a limited audience. The present invention has been reduced to practice by the inventors and is referred to herein generally as Makyoh. Features include version-control, secure storage, permanent handles for publications and versions (URIs), and the ability to build compound documents and organize documents into directory trees. It also provides features including robust redundant storage, an intuitive "paper-like" publication and access-control model, and the ability to operate in environments with slow, partitioned or no network access.

The present invention introduces the idea of a "feed", a term borrowed from but otherwise not to be confused with, "news feeds" used on the Web. A "feed" in accordance with the present invention can represent a mutable document, wherein each new "feed entry" represents a new version of the document. A "feed" can also represent a publication channel where each feed entry is its own content; e.g. blog entries or messages on a message board. Each individual entry in a feed can be accessed through its own unique URI. The present invention provides special URIs for accessing the latest entry in a feed (useful for representing version-controlled documents) and for accessing a merged view of all known entries (useful for representing blogs and other aggregations of multiple documents over time).

Entries can be posted to a feed from multiple machines (Makyoh servers) and if desired by multiple authors. Authoring, distribution and reading of documents are all completely decentralized. The ability to publish is garnered by obtaining the publication key for a feed.

To access a particular document or feed, a user must possess that document's or feed's key. Each document, as represented by a file or set of files, is associated with a unique key called a "document key." A document key grants the ability to both identify and decrypt the file or set of files that make up a single, fixed version of the associated document. Each feed (and its entries) is associated with two unique keys, called a "subscription key" and a "publication key." A subscription key grants the ability to both identify and decrypt the file or set of files that make up entries in the associated feed, but does not grant the ability to add new entries to the feed. A publication key grants the ability to both identify and decrypt the file or set of files that make up entries in the associated feed, and also grants the ability to add new entries to the feed through a process called "publication." A user can grant access to a document or feed to someone else by giving the appropriate key. The receiver will then "import" the key into his or her personal Makyoh server. In an embodiment of the present invention, the key is encrypted using the user's passphrase and stored in a private directory on his or her personal Makyoh server's local disk.

A personal document archive system according to the present invention provides robust, secure document storage and sharing without requiring any of the infrastructure required in conventional archiving systems. It is robust without requiring dedicated servers, scheduled backup or even a reliable network, and it is secure without the need for account password, firewalls or secure server rooms. To an end user (and his applications), the archive appears to be a local disk. Once the user has entered his passphrase to unlock the system, his entire archive is available in this manner. In a particular embodiment of the present invention, each file and directory is actually stored on disk in its own encrypted file called a blob (Binary Large OBject). Each blob has its own unique 128-bit symmetric decryption key. No one can access the contents of an archive without the appropriate key, even if they steal the hard drive. Blob decryption keys can be listed in encrypted directory blobs, but not in all cases. For example, the key for a blob representing a single-file document might only exist as a printed 2D barcode representing the document key.

As stated above, conventional centralized and decentralized systems typically differ in how control over a document is divided between the publisher and the reader, with centralized systems leaving more control in the hands of the publisher and decentralized systems giving the reader more control. In accordance with the present invention, control over how resources (e.g., files, directories and feed entries) can be accessed and modified is more evenly balanced between publishers and consumers than is the case in either typical central server systems like the Web or decentralized systems like email. In particular, the present invention ensures the following needs are met for readers, publishers, and re-publishers (e.g., readers who are also publishers; e.g., readers who modify material they have read and then publish the modified material).

A. Reader's Needs

Permanence: guarantee that the reader's own mirrored resources can not be deleted or modified without his permission.

Sharability: ability to share resources with others, even when those resources were originally authored by someone else.

Updates: ability to receive the latest published version of a resource. (In the present invention, multi-versioned resources are represented with feeds, where each version is an entry in the feed.)

B. Publisher's Needs

Access control: ability to restrict initial access to a resource. (However, anyone who is given access can still forward the resource to others.)

Versioning: ability to publish new versions of a resource.

Authentication: ability to prove authorship of one's publications.

Pseudonymity: ability to author materials with a name that is not tied to a physical identity.

Integrity: ability to ensure that readers can tell whether their mirror of a resource is complete (that is, to tell when they have all the files necessary to read a complete document or feed entry).

Escrow: ability to publish documents "in escrow," such that encrypted documents are mirrored by third parties but can not be decrypted until a key is produced at a later time.

C. Re-Publisher's Needs

Linking: ability to publish resources that themselves link to or use resources authored by someone else, and the guarantee that these linked-to or included resources will not change from what was originally published.

Branching: ability to create a new resource that is based on the content of another resource, potentially one authored by someone else.

While striving to satisfy the needs of publishers, compared to Web-based publishing systems, a system according to the present invention tends to grant more power to readers and re-publishers. This is for two reasons: First, as was stated above, there are many environments where giving end-readers the ability to re-distribute and republish information is far more efficient than central control. Words like "sharing" and "republishing" give nightmares to executives in the music and movie industries, but this kind of communication is the norm when it comes to internal office communication, especially when dealing with paper documents. Second, most technology trends are pointing towards more reader control rather than less. Local storage capacity continues to increase and local CPUs continue to get faster, while mobile network speeds and the batteries necessary to power them are improving far more slowly. Web pages that might disappear are cached not just by Google, but by non-profit organizations like The Internet Archive, the Memory Hole and even independent bloggers. Content sites that were once published exclusively on the Web are increasingly offering podcasting and RSS feeds that make it easy for readers to download content and read or listen to it from their own local cache. Meanwhile, Digital Rights Management (DRM) systems that are designed to restore power to publishers in the music, movie and book industries are finding their schemes cracked soon after release, and security experts say the very idea of DRM is fundamentally flawed.

DETAILED DESCRIPTION OF THE INVENTION

The present invention has been reduced to practice by the inventors and is referred to hereinafter generally as Makyoh. A prototype version of the Makyoh personal server has been implemented on a Java-based server. Encryption, storage, versioning, digital-signature functions, peer-to-peer distribution and server discovery have all been implemented.

I. Overview

Makyoh provides robust and secure document storage and document sharing without needing any of the conventional infrastructure, as described above for example. It is robust without requiring dedicated servers, scheduled backup or even a reliable network, and it is secure without the need for account passwords, firewalls or secure server rooms. In accordance with an embodiment of the present invention, to an end user (and his applications), a Makyoh archive appears to be a local disk (actually a locally-running WebDAV server, what is sometimes called a Web Folder). Once the user has entered his passphrase to unlock the Makyoh system, his entire archive is available in this manner (i.e., as a local disk). As with all WebDAV servers, his archive can also be viewed as a web page using a standard web browser. In a particular embodiment, each file and directory is stored in its own encrypted file called a blob (for Binary Large OBject) on persistent storage media such as a hard drive, or removable media (e.g., devices popularly referred to as "thumbnail drives"). Each blob has its own unique 128-bit symmetric decryption key. Consequently, no one can access the contents of an archive without the appropriate key, even if they steal the storage media. Blob decryption keys can be listed in encrypted directory blobs, but not in all cases. For example, the key for a blob representing a single-file document might only exist as a printed 2D barcode representing the document key.

II. Makyoh

Figure 1:
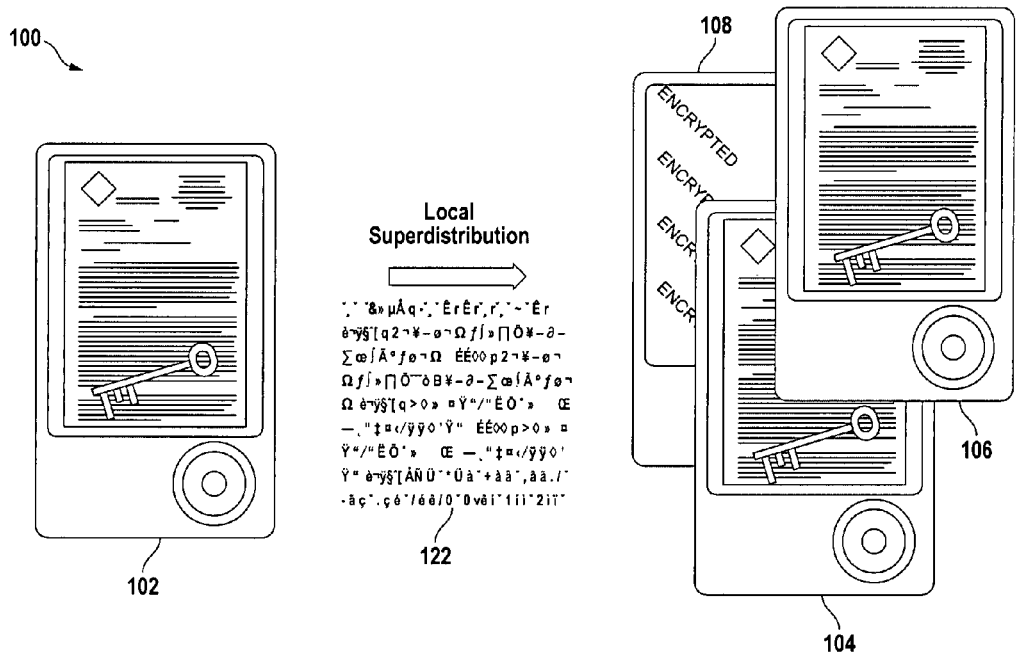
FIG. 1 illustrates a system of personal archive servers in accordance with an embodiment of the present invention.

A personal document archive system 100 (also referred to herein as Makyoh) in accordance with the present invention is shown in FIG. 1. The system 100 comprises a plurality of personal servers (referred to herein variously as personal servers, Makyoh personal servers, Makyoh servers, servers, and the like) for receiving and storing documents and for serving documents. The figure illustrates, as an example, four portable personal servers 102-108 such as laptop computers, hand held data devices, cell phones, etc. It will be apparent that the personal servers 102-108 can also be traditionally non-portable computing devices such as desktop PCs, and the like. Communication among the personal servers 102-108 can be by any suitable wireless technology (e.g., Bluetooth, IEEE 802.11, and so on), or over any suitable wired technology (e.g., ethernet, serial port connections, and so on).

The personal servers 102-108 collectively provide both secure storage of resources and a secure peer-to-peer model for publishing resources to a limited audience. Each personal server 102-108 stores a Makyoh archive comprising of one or more resources, where a resource is a file, directory, feed or feed entry. Each Makyoh archive can be thought of as an encrypted, locally-cached mirror of both resources that have been created locally and those that have been created on other Makyoh servers and subsequently published. A Makyoh archive is implemented using a combination of encrypted blobs (representing files, directories and feed keys), a set of decryption keys, and feed entry files, each of which is associated with a particular feed. Typically, every user will have stored on her personal server her own locally-stored Makyoh archive. Additional details of a Makyoh archive will be given below.

A Makyoh personal server 102 performs three main functions. First, the server maintains an encrypted, version-controlled personal archive. Second, the server acts as a local mirror of resources that have been published by other Makyoh personal servers 104-108. Finally, the server distributes these mirrored resources to other Makyoh personal servers with which it comes into contact. In this way, every Makyoh personal server 102-108 functions as a personal archive, as a node and router in a peer-to-peer network, and as a mirror for nearby archives. All personal servers 102-108 are able to participate in routing and mirroring activities, but since all resources are encrypted, only those who know the decryption key for a given resource are able to read its contents.

Because blobs are always encrypted they can be distributed freely without worrying about revealing sensitive information. In particular, whenever a user accesses a resource, his local Makyoh server 102 will automatically find all nearby Makyoh servers 104-108 (using an open protocol called Bonjour) and distribute all the blobs associated with that document to all other Makyoh servers in the area. This process, referred to herein as "local superdistribution", accomplishes two things: First, it automatically creates an encrypted backup of the user's documents 122 on all the other machines (Makyoh servers) in the area. Second, it pre-caches documents that the user might want to share with other people in the area.

Figure 1A:
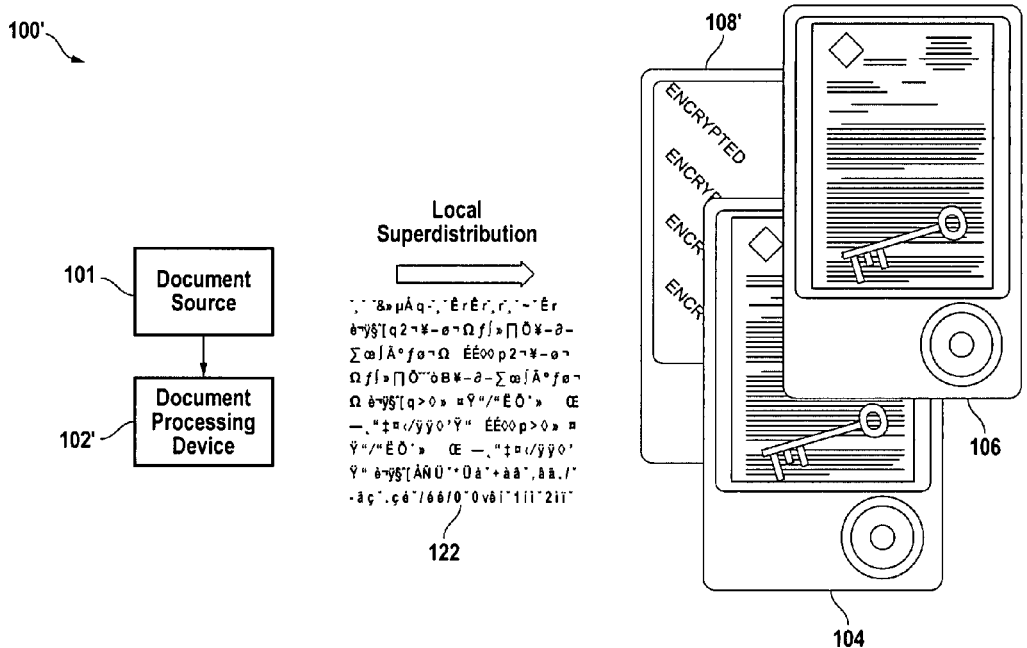
FIG. 1A represents alternative embodiments of the personal archive servers of the present invention.

FIG. 1A illustrates a more generalized embodiment of the present invention. In the illustrated embodiment, the device 102' can be any document processing device that is also configured to provide the functionality of a Makyoh server as disclosed herein. For example, the device 102' can be a photocopier, a facsimile machine, a printer, and so on, including combinations thereof. For example, in the case where the document processing device 102' is a copier, a document source 101 (e.g., a human user) will place the documents on the copier for copying and initiate a copy operation, for example, by pressing a "start" button. In addition to performing a copying operation, the copier can be configured to perform encryption, storage and distribution of the document according to the present invention, described in more detail below. Where the document processing device 102' is a printing device, the document source 101 can be a computing device attached to the printer (e.g., a laptop connected locally to the printer, or accessing the printer via a network connection). When the document for printing is received by the printer, the document can be encrypted, stored and distributed according to the present invention, in addition to being printed.

Figure 2:
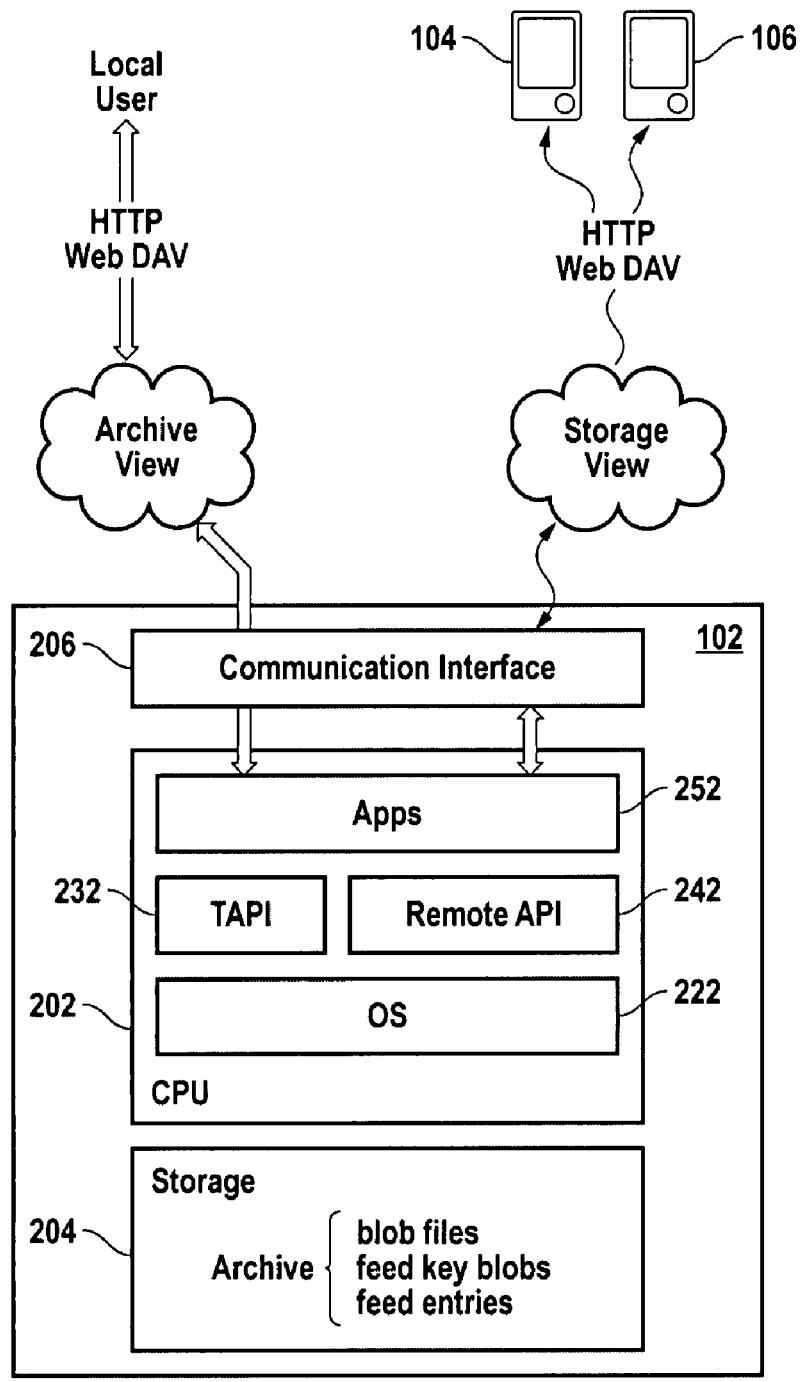
FIG. 2 is a block diagram of a personal archive server according to an embodiment of the present invention.

FIG. 2 illustrates a high level block diagram of some hardware and software elements comprising a Makyoh server 102 in accordance with an embodiment of the present invention. The Makyoh server 102 comprises a suitable data processing component 202 such as general CPU, a custom ASIC (application-specific integrated circuit), or any other suitable data processing logic. A generic representation for storage is shown as storage component 204 and represents storage capabilities of the server 102, for transient data storage (e.g., DRAM, etc.) and for persistent data storage (e.g., hard drive, ROM, flash memory, removable flash memories, and so on). The storage component 204 stores program code, among other data, for execution by the data processing component 202 to perform operations relating to operation of the server 102 in the personal archive system of the present invention, as will be discussed in further detail below. The storage component 204 also stores the Makyoh archive, details of which are described below.

A communication interface 206 represents hardware and software elements for communication with users and other Makyoh servers 104, 106. For example, the communication interface 206 can include one or more connectors to which a display device and an input device (e.g., keyboard) are connected, and related drivers for interacting with the display device and the input device. The communication interface 206 can include connectors (e.g., ethernet) for wired communication with other Makyoh servers 104, 106. The communication interface 206 can include a wireless transceiver (e.g., Bluetooth or 802.11 compliant hardware) for wireless communication with other Makyoh servers 104, 106.

The data processing component 202 is shown executing an operating system (OS) 222. For example, in an embodiment of present invention the OS 222 can be the Microsoft® Windows operating system, the Apple® OS X operating system, or the Linux operating system. The data processing component 202 is also shown executing two application programming interfaces (API), one called a trusted-user API 232 and the other called a remote-user API 242. These APIs, working in conjunction with functionality of the OS, provide application level programs 252 with functionality in accordance with the present invention. The APIs 232, 242 are discussed in further detail below.

The APIs 232, 242 provide services for higher level applications 252. In a particular embodiment of the present invention, one such application 252 is a Java-based server. The server application includes all the WebDAV (WEB-based Distributed Authoring and Versioning) functionality necessary for mounting a resource or full archive as a disk under the OS 222 (e.g., Microsoft® Windows operating system, Apple® OS X operating system, Linux operating system, etc.). The archive can then be browsed and modified using the operating system's standard file-browsing user interface, or any other suitable file-browsing application.

III. Keys and Hash URIs

Every resource in a Makyoh archive (explained below) can be associated with a unique URI (Universal Resource Identifier) referred to herein as a "hash URI". This special type of URI follows the general URI format commonly used with Web browsers, having the following specific form:

hash:sha1=<id>;aes128-key=<key>?content-type=<MIME-type>&name=<name> where:

<id> is the SHA-1 (Secure Hash Algorithm 1) hash of the encrypted blob representing the file or directory, encoded as a lowercase 40-character hexadecimal string. The parameter identifier (currently sha1) indicates the hash algorithm used to generate the content's unique ID, and future extensions to the format may include additional hash algorithms. IDs may be considered globally unique because, while it is theoretically possible for two distinct blobs to by chance have the same ID, one would need to generate $2^{66}$ blobs before there was even a one-in-a-million chance of finding just one such collision.

<key> is the AES-128 key used to decrypt the associated blob, encoded as a lowercase 32-character hexadecimal string. In Makyoh, this key will always be the MD5 (Message-Digest algorithm 5) hash of the plaintext file, prepended with a header as described below. The key field is optional, and can be omitted to form a hash URI that identifies an encrypted blob without specifying the decryption key necessary to read it. The parameter identifier (currently aes128-key) indicates the encryption algorithm used, and future extensions to the format may include additional algorithms.

<MIME-type> is the file's MIME (Multipurpose Internet Mail Extensions) type, a very well known and understood data type. Makyoh-specific files (e.g., directory and feedkey files) use the MIME type text/plain.

<name> is the name of the file or directory. This typically will include an extension, e.g. "my-document.pdf".

Hash URIs function as both identifiers and keys, and thus can be used to both retrieve encrypted blobs from nearby servers 104-108 and to decrypt those blobs once they are retrieved. Once retrieved, the remaining fields let the server know how the blob contents should be decrypted and presented to the user.

Access control in Makyoh is primarily done using hash URIs. Once someone imports a hash URI (often simply called a key) into his Makyoh archive he has access to the contents of the file it identifies. Makyoh also uses special kinds of files, namely directory blobs and feedkey blobs, to grant access to a large and possibly extensible set of files given a single hash URI. In general, users will interact with three kinds of hash URIs: document keys, which give access to a single immutable file or directory tree, subscription keys, which give the ability to read feed entries for a particular feed, and publication keys, which give the ability to both read feed entries for a particular feed and publish new entries for that feed.

A hash URI can be used directly as a hyperlink, similar to how URLs are embedded in email and web pages. All that would be necessary is to write a browser plug-in to access the new URI format and retrieve the necessary blobs from some data store. However, this kind of usage is discouraged in Makyoh because it is not very flexible in terms of access: if a user has access to a document that contains a hash URI for another document he automatically has access to both. If at a later time the author wanted to allow access to only the first document he would need to edit its contents and remove all mentions of the second hash URI before handing out the hash URI to the first document.

Instead of using a hash URI directly, it is preferable to use the archive directory structure that is presented in the trusted-user API, which is based on the ID of a document or feed. As with hash URIs, the path to a particular document or feed entry is the same for all Makyoh users, but unlike hash URIs an archive path does not reveal the document's decryption key. Users who already have the key (and thus have been given access to the document or feed) will be able to access the file or files at the given path, while other users will not.

IV. API's

Makyoh provides a personal archive, and typically every user will run his own individual personal server 102. The personal server 102 maintains an encrypted, local copy of all the user's entire archive, and will also replicate encrypted documents on nearby servers 104-108. This distinguishes Makyoh from conventional distributed document stores like FreeNet or OceanStore, which assign each file to specific nodes in a distributed network of storage servers. Makyoh presents two separate APIs:

The first API is the "trusted-user API" shown in FIG. 2. As the figure illustrates, the Makyoh archive appears via the trusted-user API 232 as a virtual file system (also referred to as the archive view). It is "virtual" in that the file system structure that is presented to the trusted user is not necessarily that of the underlying organization of the constituent files of the Makyoh archive as they are stored on the storage device. The virtual view presents abstractions of the underlying physical files that constitute the Makyoh archive. The virtual view can be any suitable file structure view; a common paradigm of course is the hierarchical file structure. For purposes of discussion, a virtual hierarchical file system will be assumed.

As FIG. 2 illustrates, the trusted-user API 232 presents the Makyoh archive as a file system of folders and documents organized in a directory hierarchy (virtual file system, archive view). Additional details of this archive view are discussed below. The Makyoh archive can be accessed either using a standard Web browser communicating with the local Makyoh server 102 (also referred to as localhost) using HTTP, or as a part of the local file system (sometimes called Web Folders) using the WebDAV protocol. The trusted-user API 232 is only available from locally-generated connections (that is, connections to localhost 102), and only after the user has authenticated with the Makyoh server using his passphrase.

The second API is the "remote-user API", also shown in FIG. 2. The remote-user API 242 presents to other Makyoh servers 104, 106 (so-called un-trusted users) the raw files comprising the Makyoh archive (e.g., feed entry files, encrypted blobs, and so on) as they are actually stored in the storage component 204. These raw files are also accessible via HTTP and WebDAV protocols, and are used by other Makyoh servers to find and retrieve needed blobs and feed entries, and to push blobs and feed entry files onto yet other servers.

A. Trusted-User View

From an authenticated user's perspective, the virtual file system view of the Makyoh archive comprises two kinds of resources: documents and feeds. A "document" is an immutable file or directory tree, while a "feed" specifies a distribution channel through which one may subscribe to new documents (called entries) that are published to the feed. Each document and feed is associated with a unique URI (Universal Resource Identifier) which serves both as an identifier and a decryption key allowing access to the resource. Documents are immutable; a URI pointing to a document is guaranteed to always point to the same exact contents. Feeds are mutable, in that new entries can be published to a given feed. Each feed entry is identifiable by its own URI, and will itself point to an immutable document that represents the contents of the entry. A feed can be used as a publication channel where each feed entry is its own content (e.g. blog entries or messages on a message board), or it can represent a mutable, version-controlled document where each new feed entry represents a new version of the document.

Figure 3:
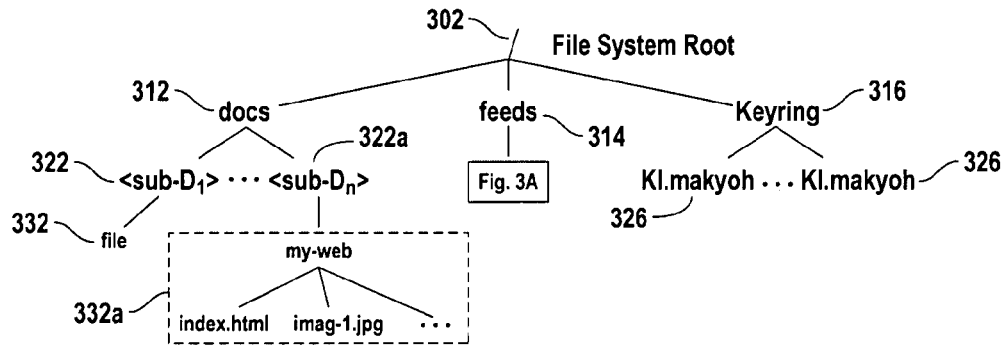
FIGS. 3 and 3A represent an archive view of an archive according to the present invention.

FIG. 3 shows an example of the virtual file system view of the Makyoh archive that is presented to the trusted user. As illustrated in FIG. 3, the root directory tree 302 of the virtual file system of a server 102 that is presented to local authenticated users comprises three directories: docs, feeds, and keyring. The root directory tree 302 represents the highest level in the virtual file system view of the Makyoh archive and does not necessarily coincide with the "root" of the underlying physical file system.

A docs directory 312 contains documents which are immutable; i.e., do not change. A feeds directory 314 contains feed entries which are mutable by virtue of receiving entries published by the local server 102 and by remote servers 104-108. The user can decrypt and view those documents in the docs directory 312 and feed entries in the feeds directory 314 for which he has imported the appropriate document, subscription or publication key. A keyring directory 316 contains all keys that the user has ever imported. In an embodiment of the present invention, these keys are been encrypted using the user's passphrase as a symmetric key and stored in a private directory on the local server 102.

Documents are stored under the docs directory 312 in respective subdirectories 322. Each subdirectory 322 is named by an identifier referred to as the blob-Id, which is defined as the SHA-1 hash of the encrypted contents of the blob representing the file or root directory for the document, written as a lowercase 40-character hexadecimal string. For example, where the document 332 is a single file (e.g. "my-document.pdf"), the name of the subdirectory $<sub-D_1>$ within which that file is presented is based on the SHA-1 hash of the encrypted contents of the file's corresponding blob. For example, suppose the SHA-1 hash of the encrypted contents of the encrypted blob representing my-document.pdf is the text string:

"c10b555f72d954c8c889c97d357161790e0da4a5".

In an embodiment of the present invention, the pathname for the document might appear as:

/docs/c10b555f72d954c8c889c97d357161790e0da4a5/my-document.pdf, where the SHA-1 hash of the encrypted contents of the encrypted blob representing my-document.pdf (dashed underlining) serves as the name of $<sub-D_1>$.

If a document consists of a directory of files, then the name of the subdirectory is based on the SHA-1 hash of the directory blob corresponding to the directory of files. The "directory blob" is an invisible file which stores information about the contents of the directory itself, e.g., a list of files and/or sub-directories. For example, FIG. 3 shows that subdirectory 322a contains a directory of files, called "my-web-page". The directory file, schematically indicated in FIG. 3 by the dash-lined box 332a, contains information about the directory "my-web-page". The name of the subdirectory 322a is based on the SHA-1 hash of the encrypted contents of its directory file 332a, and in an embodiment of the present invention the pathnames might appear as:

/docs/2f267747fd8b6212aed119ec05f42bc014f2ed7/my-web-page/index.html

/docs/2f267747fd8b6212aed119ec05f42bc014f2ed7/my-web-page/image-1.jpg

/docs/2f267747fd8b6212aed119ec05f42bc014f2ed7/my-web-page/ . . .

where the name of $<sub-D_n>$ is the text string:

"2f267747fd8b6212aed119ec05f42bc014f2ed7"

representing the SHA-1 hash of the encrypted contents of its directory file 332a. Of course, the "my-web-page" directory can itself contain subdirectories.

Figure 3A:
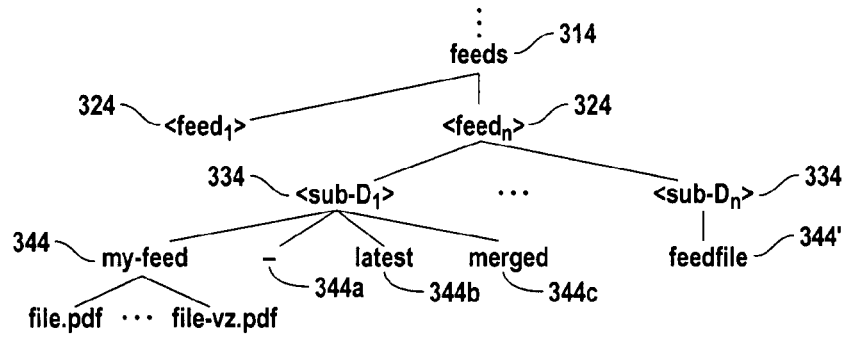

Referring to FIG. 3A, feeds are stored under the feeds directory 314. Each feed is stored in a feed subdirectory 324 named by the feed's ID, which is defined as the fingerprint of the public key used to verify the feed's signature (described later). Each feed directory 324 contains a subdirectory 334 for each entry, named by the creation time of the entry followed by a period (".") followed by the SHA-1 hash of the contents of the feed entry file. The creation time should be encoded in Coordinated Universal Time (UTC) in the form yyyyMMdd+ 'T'+HHmmss+'Z', where "hh" is the hour in 24-hour format and 'T' and 'Z' are the literal characters T and Z.

Within a feed subdirectory 334 is a file 344' or a directory tree 344 representing the entry. For example, a feed with two entries might appear as:

/feeds/2f267747fd8b6212aed119ec05f42bc014f2ed7/
20070302T005408Z.25275a4085476e08cda88cd701
d1949c72612d1a/my-feed/file.pdf
/feeds/2f267747fd8b6212aed119ec05f42bc014f2ed7/
20070306T161144Z.bca9e1954824a32b1f8424511b
3f011340ffe231b/my-feed/file-v2.pdf The feed-Id is:
2f267747fd8b6212aed119ec05f42bc014f2ed7
and an example of the name of a subdirectory 334 is:
20070306T161144Z.bca9e1954824a32b1f8424511b3f
01340ffe231b.

Feeds also contain up to three other directories: a scratch directory ( . . . /-/) 344a; a latest directory ( . . . /latest/) 344b; and a merged directory ( . . . /merged/) 344c. If a user has the ability to publish to a given feed, the scratch directory 344a will be available in the corresponding subdirectory 334. This is an editable, local-only directory that can later be published as a feed entry. The contents of the scratch directory are not available to other Makyoh servers until they are published. If a feed contains at least one published entry then corresponding latest and merged directories 344b, 344c will be available. The latest directory 344b always contains a copy of the latest known entry, determined by the entry's timestamp. The merged directory 344c contains a merge of all paths contained within all known entries.

For example, if a feed contains two entries, one containing the path . . . /images/thing1.jpg and the other containing the path . . . images/thing2.jpg, a listing of . . . /merged/images/ would show both thing1.jpg and thing2.jpg. The directory structure might appear as:

/feeds/2f267747fd8b6212aed119ec05f42bc014f2ed7/-/
/feeds/2f267747fd8b6212aed119ec05f42bc014f2ed7/
20070306T . . . 231b/images/thing1.jpg
/feeds/2f267747fd8b6212aed119ec05f42bc014f2ed7/
20070528T . . . 54f2/images/thing2.jpg
/feeds/2f267747fd8b6212aed119ec05f42bc014f2ed7/
merged/images/thing1.jpg
/feeds/2f267747fd8b6212aed119ec05f42bc014f2ed7/
merged/images/thing2/jpg In cases where two different files share the same complete path, the later file takes precedence.

The keyring directory 316 is a directory containing all keys that a user has ever imported. Keys are represented as key files 326 with the extension ".makyoh". Key files for document keys contain the hash URI of the file or directory that represents the document associated with the key. As will be explained below, there are two kinds of keys for a feed, a subscription key and a publication key. Key files for a feed's subscription key contain the hash URI of the subscription feedkey blob. Similarly, key files for a feed's publication key contain the hash URI of the publication feedkey blob.

Local users can perform the usual HTTP and WebDAV requests: GET, PUT, HEAD, MKCOL, PROPFIND, LOCK, UNLOCK, DELETE, MOVE, COPY and OPTIONS (POST is not currently supported). In addition, local users (i.e., users on the localhost 102) may perform various operations by performing an HTTP GET request to the localhost 102 on the appropriate port with the query parameter op=<operation> (e.g. GET http://localhost:8088/?op=create). The following operations are provided:

login: authenticate to the local Makyoh server. Except for the login and stop operations, the trusted-user API is not available until a user logs in. Takes the parameter passphrase, the user's login passphrase. On the very first login for a user, the passphrase will be set.

create: create a new feed. Generates both subscription and publication keys. Returns with the feed's path and hash URIs pointing to both feed keys.

createdoc: create a new document. The path part of the request URL should be a file or directory within a feed. Currently, the document's content-type is determined automatically from the extension of the filename on the given path, or text/plain for directories. The parameter name may optionally be provided to use a different filename than the one given in the path.

publish: publish a new feed entry. The path part of the request URL should be a file or directory somewhere under the /feeds/<feed-Id>/ directory for the desired feed. The feed's publication key must be known. The filename for the root directory of the entry defaults to the feed's name, but can be overridden by setting the name parameter. Setting the optional parameter erase to true will cause the scratch directory (/-/) to be erased after publication.

import: import a new key (hash URI), and attempt to retrieve and/or superdistribute any associated blobs and feed entry files. The key parameter should be set to the hash URI to import.

stop: shut down the Makyoh server cleanly.

dbtrace: show contents of temporary databases and request lists. Used for debugging. Optional parameter limit can be set to limit the number of lines returned.

info: show information about feed or document specified in the request URL path. Information is intended to be easily parsed by a program. Currently performing info on a feed gives the feed's name, publication key (if known) and subscription key, each on their own line. This is followed by each feed entry's hash URI and creation date (separated by a TAB), each on their own line. For documents, the document's name is on one line, its hash URI is on the next.

iscomplete: if all the blobs and files necessary to show the requested URI's path are available in the local cache, return the string true. Otherwise, return the string false. This is useful to determine whether a newly imported directory or feed entry has finished downloading from nearby servers yet.

B. Remote View

Figure 4:
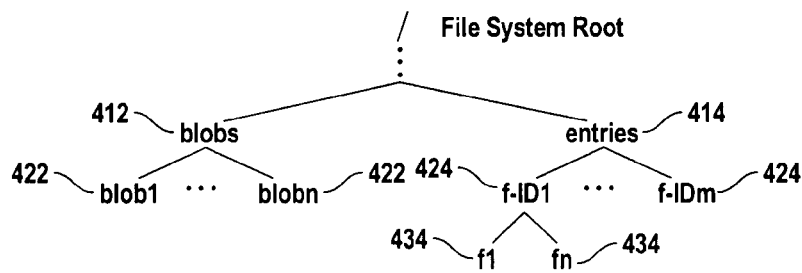
FIG. 4 represents a storage view of an archive according to the present invention.

Referring to FIG. 4, connections to Makyoh server 102 from remote Makyoh servers 104-108 are presented with a view ("physical view") of the files as they are stored on the storage device of the storage component 204 of the Makyoh server 102. This is compared to the archive (logical or virtual) view that is presented a trusted user described in FIG. 3.

In a particular embodiment, the remote user is presented with a blobs directory 412 and an entries directory 414. The blobs directory 412 simply contains encrypted blob files 422, each with the SHA-1 hash of its encrypted file contents as its filename. For example:

/blobs/003920e219057a12af32bbb65f196ade61e868c3
/blobs/0b294c4e2ca8903939673513df366567e9a13c7a Blobs 422 can represent normal content files, directories or special internally-used files called "feedkeys".

The entries directory 414 contains feed entry files 434, each within a subdirectory 424 named with the feed's ID. The entry file itself 434 is named by the creation time of the entry followed by a period (".") followed by the SHA-1 hash of the contents of the feed entry file. As described above, the creation time should be encoded in Coordinated Universal Time (UTC) in the form yyyyMMdd+'T'+HHmmss+'Z', where "hh" is the hour in 24-hour format and 'T' and 'Z' are the literal characters T and Z. For example:

/entries/2f267747fd8b6212aed119ec05f42bc014f2ed7/
20070302T005408Z.25275a4085476e08cda88cd701
d1949c72612d1a /entries/2f267747fd8b6212aed119ec05f42bc014f2ed7/
20070306T161144Z.bca9e1954824a32b1f8424511b
3f10340ffe231b In accordance with an embodiment of the present invention, the files and directories presented in the remote view are the actual files and directory structure as stored on disk. Remote servers can perform a subset of the HTTP and WebDAV (type 2) requests; e.g., GET, PUT, HEAD, MKCOL, PROPFIND, LOCK, UNLOCK and OPTIONS. Other requests (e.g., POST, DELETE, MOVE, or COPY) will return with a Bad Request (400) error.

V. File Formats

A. Blob File Format

Figure 5:
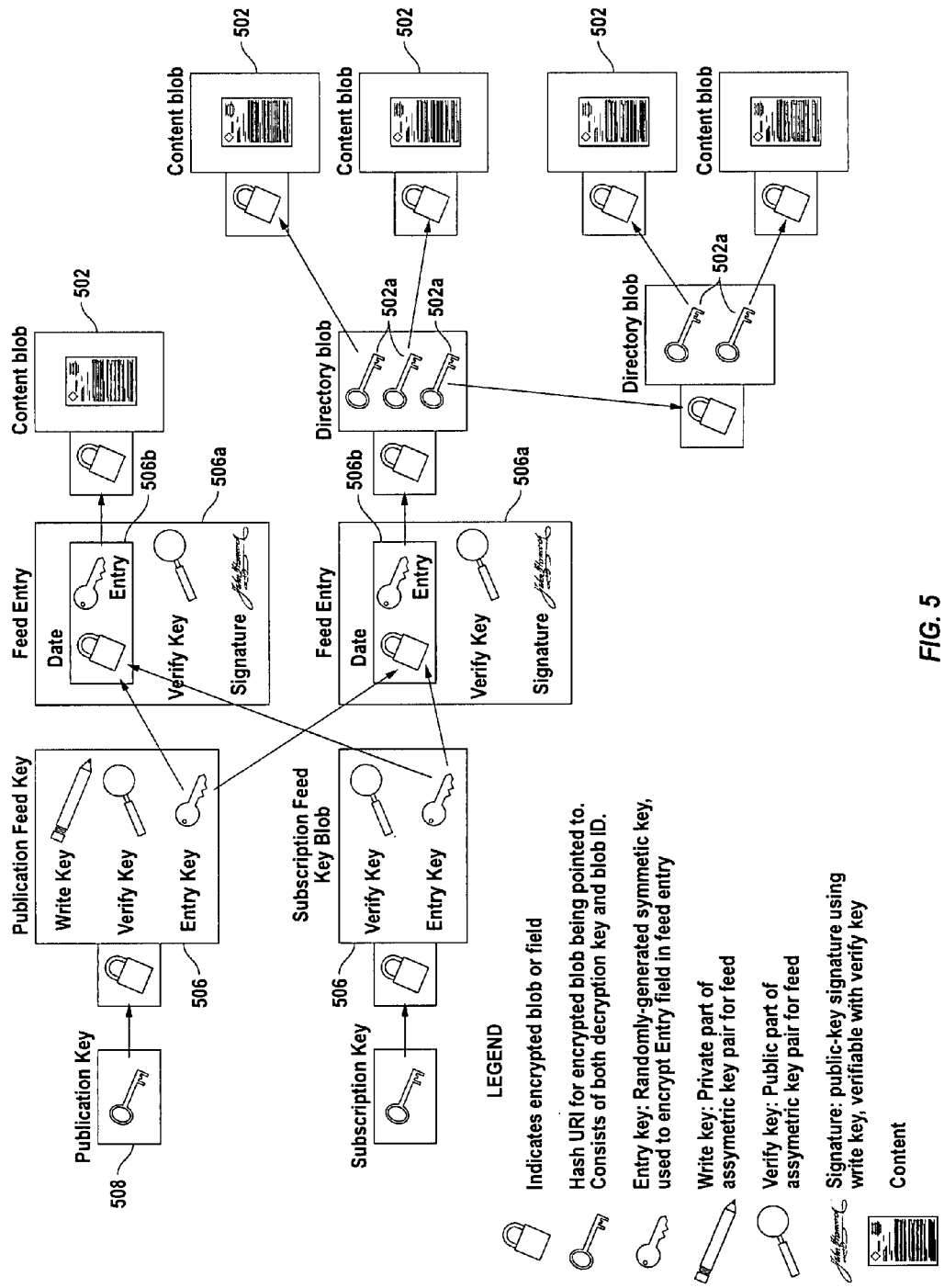
FIG. 5 illustrates the feeds architecture according to the present invention.

Referring now to FIG. 5, blob files 502 are immutable, and represent just a single version of a file as it existed at a particular time. In FIG. 5, each blob file 502 is illustrated by a document icon and a lock icon. The document icon associated with a blob file 502 represents the contents of the file, which the associate lock icon indicates that the contents are encrypted. The encrypted contents of the blob files 502 are decrypted using their respective symmetric decryption keys 502a. Each decryption key 502a is illustrated in FIG. 5 with an arrow leading to the encrypted blob file 502 for which it is serves as the decryption key.

As stated above, a blob file 502 is immutable; i.e., a given instance of a blob file cannot be modified. A user can, nonetheless, make modifications for example by reading in the file, making the desired edits, writing out the modified contents into an entirely new blob file along with its own unique ID and decryption key 502a. A blob file 502, along with its ID and key 502a, are automatically computed based on the contents of the file being encrypted. The file is first prepended with a null-terminated header consisting of the blob's type (currently blob, directory or feedkey), the document's length in bytes and an optional "salt" string, all separated by spaces. This plaintext is then compressed using a known algorithm called the DEFLATE algorithm and encrypted with the known Advanced Encryption System algorithm using the MD5 hash of the plaintext as the encryption key. The ID for the resulting blob is the SHA-1 hash of the encrypted blob's contents, encoded as a 40-hex-digit lowercase string. More formally:

header=type+" "+length [+" "+salt]+null
   type="blob"|"directory"|"feedkey"
   length=the document length in bytes, represented as a decimal string
   salt=an optional string of up to 128 bytes
   null=the zero byte (0x00)
blob-key=MD5(header+document), represented as a 128-bit number
init-vector=the zero byte (0x00)
compressed-doc=DEFLATE(header+document), with the modification time stamp set to negative one (−1)
blob=AES(header+compressed-doc, blob-key, init-vector)
blob-id=SHA-1(blob), represented as a 40-hex-digit lowercase string The header serves two purposes. First, it guarantees that even zero-length documents can generate an MD5 hash. Second, it includes an optional "salt" which can be used to generate a blob file with a different ID than would be obtained if no salt was used. This can be less efficient in terms of storage, but provides additional privacy against some kinds of attacks.

One advantage of using hashes for a blob's key 502a and ID is that the process is entirely determined by document contents: multiple copies of the same exact document will produce the same blob file and blob-Id, even if the documents were independently published by different people. This reduces the amount of storage an archive uses, especially in cases where the same file appears in several different documents' directory trees. The only exception is when a publisher adds the optional salt to their headers, which (by design) creates a different blob and blob-Id based on the salt.

B. Directory Blob

A directory blob 504 is simply a list of hash URIs pointing to the files and subdirectories the directory contains, encoded and encrypted in blob format as described above. Directory blobs 504 have the type directory. For example, the decrypted contents of a directory blob 504 containing two files and a subdirectory might consist of the following:

directory 413 [null]
hash:
   sha1=0b294c4e2ca8903939673513df366567e9a13c7
   a;aes128-key=8254de7ae9e95
   bd6fef8f8a821b4aa49?content-type=text/
   html&name=index.html
hash:
   sha1=392bec1f9988f506d148166f1a02f1d9117fb2fd;
   aes128-
   key=7ba3350396f7b8502863fe52160c88ba?content-
   type=image/jpeg&name=thumbnail.jpg
hash:
   sha1=7c532dd44cd0f54201c72539dcfdbf49bd00ae4a;
   aes128-
   key=873cc62fb1af8aec4c3127b8ecfa941e?content-
   type=application/octet-stream&name=thumbnails/

When a directory is retrieved in the trusted-user API, the corresponding directory blob 504 is decrypted and the ID, key, MIME type and name of its contents are cached in a temporary database. This database is then used to present the directory structure and files of the user's archive. The use of a caching database improves performance, but is not necessary and other embodiments of the present invention can easily be implemented without a database.

C. Feed Key Blob

A feed key blob 506 is a file containing keys necessary for decrypting, verifying, and optionally for creating (publishing) feed entries. Feed keys come in two forms: subscription keys, which give read-only access to a feed, and publication keys which grant both the ability to read entries and to publish new entries. The feed key file 506 consists of the following fields, each separated by a linefeed (†n). The entire contents are then encrypted and encoded as a blob, as described above.

Header: the string "MAKYOH FEEDKEY VERSION n", where n is the version number for the feed key file format being used (currently 1.0).

Entry-key: the string "Entry-key:" followed by a randomly generated 128-bit symmetric key that is used to encrypt and decrypt the Entry field in every feed entry file for this feed. The key is encoded as a 32-character lowercase hexadecimal string.

Verify-key: the string "Verify-key:" followed by a linefeed (†n), followed by the public key to be used to verify a feed entry, followed by another linefeed. For example, this key could be an ASCII-armored public key as defined by the OpenPGP Format standard. Lines should be separated by a linefeed (†n), not a carriage-return linefeed (†r†n).

Write-key: (optional) the string "Write-key:" followed by a linefeed (†n) and the secret key to be used to sign a new feed entry. For example, this key could be an ASCII-armored secret key as defined by the OpenPGP Format standard, and should be the secret-key pair of the feed's verify-key. The Write-key field is only listed in publication keys, not in subscription keys.

A feed's ID is defined as the 160-bit key fingerprint of the feed's verify key in accordance with the OpenPGP Format standard, encoded as a 40-character lowercase hexadecimal string.

D. Feed Entry File

A feed entry file 506a is a file that contains information about an entry to a feed. The feed entry file 506a comprises the following fields, each separated by a linefeed (†n). These contents are not encoded as an encrypted blob (though the "Entry" field 506b shown in FIG. 5 is encoded in encrypted form, as described below).

Header: the string "MAKYOH FEED ENTRY VERSION n", where n is the version number for the feed entry file format being used (currently 1.0).

Date: the string "Date:" followed by the creation date for this entry in Coordinated Universal Time (UTC), encoded as yyyy-MM-dd+'T'+HHmmss+'Z'. For example: "Date: 2007-03-02T00:54:08Z"

Entry: the string "Entry:" followed by the hash URI for the document (file or root directory) representing this entry, encrypted using the Entry-key specified in the feed's feed key. The encrypted contents are encoded as a lowercase hexadecimal string (usually around 256 characters).

Verify-key: the string "Verify-key:" followed by a linefeed (†n), followed by the public key to be used to verify a feed entry, followed by another linefeed. For example, this key could be an ASCII-armored public key as defined by the OpenPGP Format standard.

Signature: the public key signature on the contents of the fields listed above, using the Write-Key specified in the feed's feed key. For example, this signature could be an ASCII-armored signature block as defined by the OpenPGP Format standard.

E. Keyring

The keyring is a collection of keys (i.e., hash URI's) the user has imported. In one instantiation of the invention, the keyring is implemented as a private directory stored on the local Makyoh server 102. Referring to FIGS. 3 and 5, when a user logs into a Makyoh server for the very first time, a personal keyring directory 316 is automatically created. When a key is imported, it is encrypted using the user's passphrase as the symmetric key, and the resulting encrypted file 326 is then stored in the keyring directory 316. When the user logs in using his passphrase, Makyoh bootstraps by decrypting all key files in the user's keyring directory. The process of importing keys (hash URI's) is explained further below.

VI. Publishing and Superdistribution

A typical usage scenario of the present invention will now be described. As an example, imagine a user, Alan, is attending business negotiations with a competitor, and the user's documents are stored in his personal Makyoh archive running on his laptop. When Alan accesses an outline of the negotiation strategy on his laptop, the encrypted blob(s) for that outline will be replicated by his laptop on all other laptops running Makyoh in the area. If the key for that document is never revealed then the user has effectively securely backed up a copy of his document on the laptops of everyone else in the meeting. Conversely the user's Makyoh server is likewise backing up documents of other laptops when documents on those laptops are accessed. If Alan's laptop is later stolen, he can recover his document by purchasing a new laptop, installing Makyoh and re-importing his key(s), and Makyoh would then automatically retrieve all the necessary blobs from the other laptops in the area. In a particular embodiment of the present invention, the "key" is the hash URI described above. Users carry hash URI's (one for each document, or directory of documents, or feed entries) and pass them around to other users to give them access to the information. The hash URI is a small amount of data on the order of a hundred or so bytes that can be conveniently stored in a "key file" on a storage device (e.g., thumbdrive), on a printable medium (e.g., linear barcode, two-dimensional barcode, etc), and so on.

Now imagine that later in the meeting a colleague, Bob, asks for a copy of Alan's strategy outline. The file may be very large, especially if it contains multimedia, and might take several minutes to transfer over wireless or even USB thumbdrive. However, because Alan's Makyoh had already distributed the encrypted blobs that make up the document to the other laptops including Bob's, the data is already on Bob's laptop. Alan need only give Bob the associated key file (hash URI stored in a file), which will typically be less than a couple hundred bytes. Because keys are so small they can be transmitted quickly and securely in a variety of ways that are not possible with larger files. For example, they can be printed on business cards as 2-dimensional barcodes, beamed to a PDA via infrared, transmitted by human touch using a technology such as NTT's RedTacton, or through more traditional means such as Bluetooth or even instant messaging. Within a few seconds the colleague can access the document—even if the original transmission of the blobs (already completed at this point) had taken several minutes.

The foregoing usage description illustrates various operations of the present invention which will now be discussed in more detail in connection with the process descriptions in the figures to follow. The processing can be performed by a suitable data processing component of the Makyoh server such as shown in FIG. 2. The processing described in figures to follow can be embodied in suitable computer program code that is executed by the data processing component 202.

1. Access

When a document is accessed from an archive, the blobs' IDs associated with it are automatically added to a list of files to be pushed to other servers (the Put Blob Queue), and any blobs required by the document that are not found are added to a list of files to get from other servers (the Get Blob Queue). Similarly, when a feed entry is accessed the corresponding feed entry file is added to a list of feed entries to push to other servers (the Put Feed Entry Queue), and its feed-Id is added to a list of feeds to check for new entries on other servers (the Get Feed Queue). Requests added to the Get Blob Queue, Put Blob Queue, the Get Feed Queue, and the Put Feed Entry Queue expire after a certain amount of time (by default one hour), after which they are removed from the respective queue. Typically, these queues are implemented as data structures in the memory of the Makyoh server. However, it will become apparent from the discussion below that other mechanisms are possible.

Figure 6A:
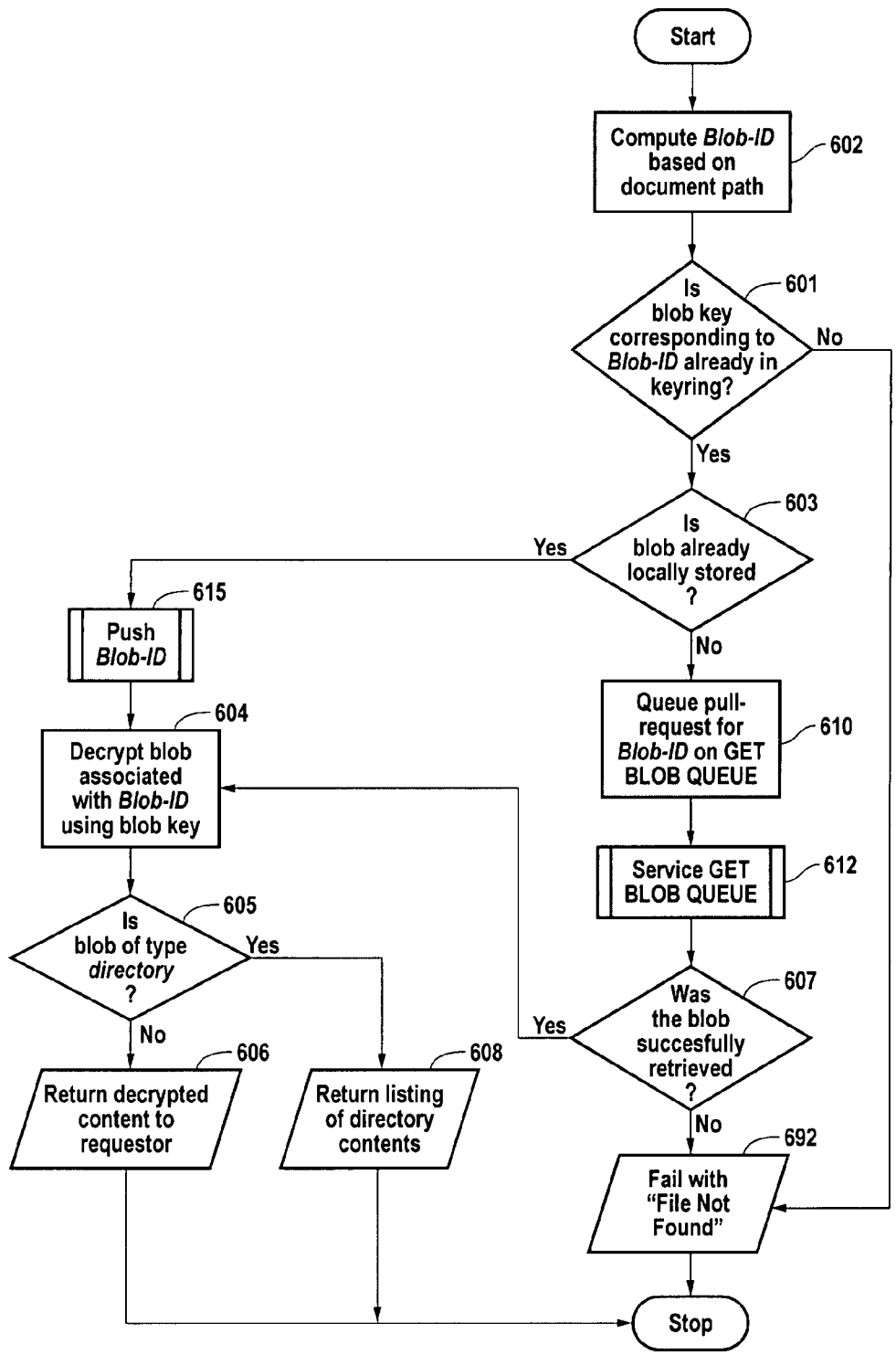
FIG. 6A illustrates the general flow for accessing a document.

Refer to FIG. 6A for a description of the general flow for accessing a document in accordance with an embodiment of the present invention. The requestor (i.e., a trusted user) will specify to a Makyoh server (the "local server") the pathname of the document to be accessed. In the trusted-API, a user specifies a full pathname for the file or directory to retrieve, for example:

/docs/c10b555f72d954c8c889c97d357161790e0da4a5/my-document.pdf, or:

/docs/92572a9472d954c8c889c97d357161790e259751/my-webpage/images/thumbnail.jpg.

Recall, in an embodiment of the invention, that the trusted user's view of the Makyoh archive is that of a virtual file system (FIG. 3). The pathname provided by the user is in the context of that virtual file system. In the embodiment of the virtual file system described herein, the file system is hierarchical such as in the Unix operating system, and hence a the pathname appears as a Unix pathname.

In a particular embodiment of the present invention, the pathname leads to the encrypted blob file from which a cleartext representation of the requested document will be obtained. When the encrypted blob is obtained, a key (the hash URI) is used to decrypt the content of the obtained blob. The discussion that follows will describe the processing that takes place in the local Makyoh server.

In a step 602, the blob-Id of the requested document is determined based on the pathname specified by the requestor. In a particular embodiment of the present invention, the blob-Id is the name of the subdirectory 322 (FIG. 3) in the pathname. Using the example above, suppose the pathname given by the requestor is:

/docs/c10b555f72d954c8c889c97d357161790e0da4a5/my-document.pdf.

The blob-Id would be:

c10b555f72d954c8c889c97d357161790e0da4a5.

In a step 601, a determination is made whether the blob-Id is already in the keyring. In the particular embodiment described above, the keyring directory 316 (FIG. 3) contains key files 326, each of which contains the hash URI of the file or document that represents the document associated with the key. Recall that the hash URI includes the blob-Id. A search is performed of the hash URI's in the key files 326 for the blob-Id determined from step 602, thus identifying the key file associated with the requested document. If it is determined in step 601 that the blob-Id is not found, then the requested document is deemed not found and a suitable response is sent in a step 692 to the requestor indicating that the requested document was not found.

If it is determined in step 601 that the blob-Id is found in one of the key files 326, then a determination is made in a step 603 whether a local copy of the requested blob file is stored in the docs directory 312 (FIG. 3) of the requestor's local Makyoh server. If not, then in a step 610 a "pull request" is queued on a Get Blob Queue by placing the blob-Id in the queue in order to attempt to obtain the requested document from another ("remote") Makyoh server. In a step 612, the Get Blob Queue is serviced, as will be discussed in more detail below. The blob-Ids in the Get Blob Queue can be serviced with each document access, or after some predetermined number of document accesses have occurred, or after a predetermined period of time has elapsed, or based other suitable criteria, or based on some combination of the foregoing. In an embodiment of the present invention, requests added to the Get Blob Queue expire after a certain amount of time (e.g., one hour), after which they are removed from the queue.

If in a step 607, it is determined that the blob was successfully retrieved from a remote Makyoh server and stored in the storage component 204 of the local server, then processing proceeds to step 604 discussed below. If it is determined in step 607 that the blob was not successfully retrieved (e.g., no other Makyoh servers contain the blob), then a suitable response is sent in step 692 to the requester indicating that the requested document was not found.

Figure 13:
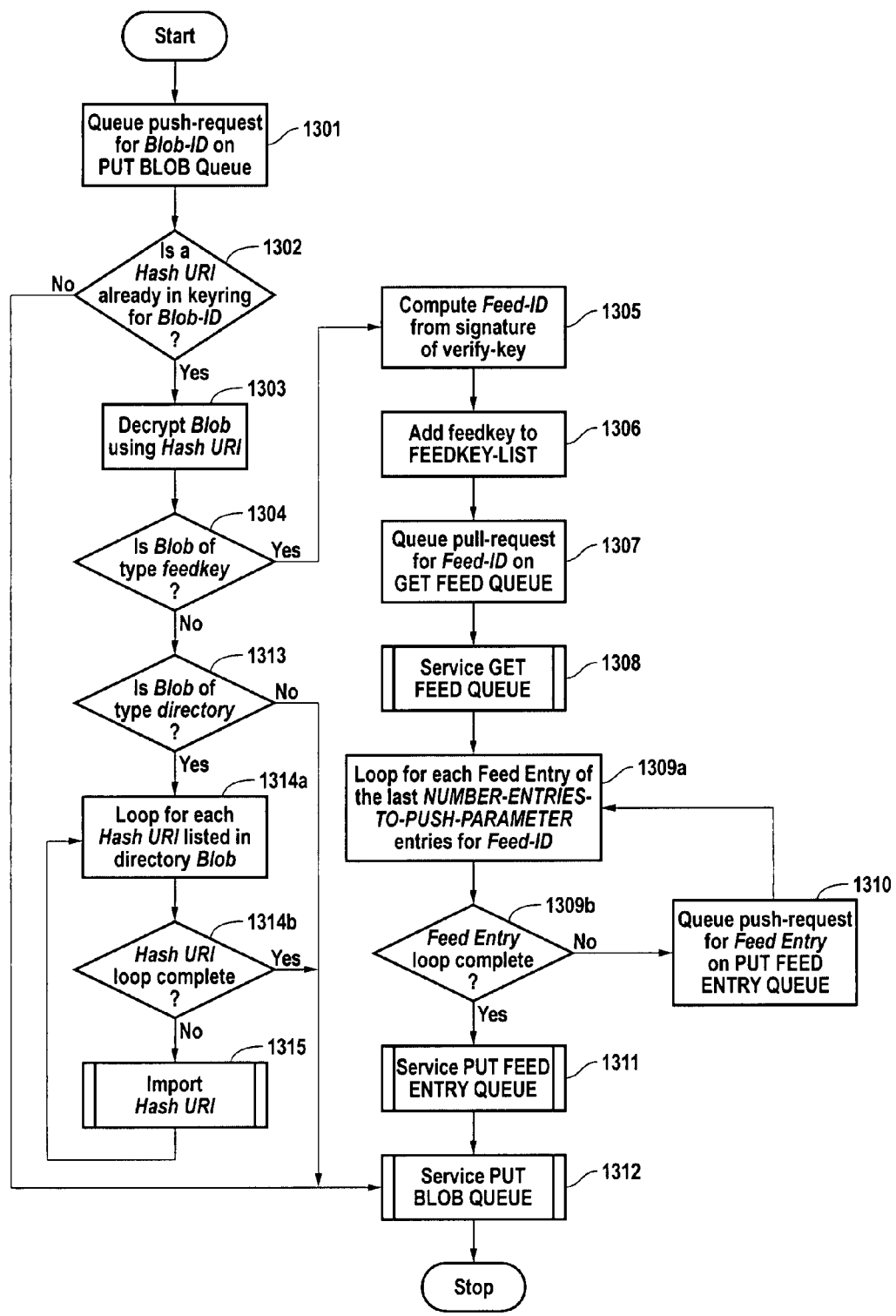
FIG. 13 illustrates the general flow for the push blob service.

If a local copy of the requested blob was found (step 603) or a copy of the requested blob file was retrieved from a remote Makyoh server (step 607), then in a step 615, the push blob service is performed as described in FIG. 13. As will become clear from the explanation of FIG. 13, this will cause copies of the requested blob to be distributed to other remote servers. In a step 604 the blob-key contained in the hash URI stored in the key file 326 associated with the requested document is obtained and used to decrypt the encrypted blob file. The resulting clear text constitutes the requested document.

Processing of contents is then handed over to the application performing the access. A determination is made in a step 605 whether the requested document is in fact a directory, or an actual document (e.g., a PDF file). If the application is a browser or the OS's windowing system then it can present the file (step 606) or directory (step 608) to the user. In the case of a "directory", the user might select one of the documents in the directory and initiate an access, thus repeating the foregoing to obtain the selected document. Another application might take an action that does not display anything to the user; e.g. it might read its configuration information from the accessed file.

Referring back to FIG. 1A for a moment, recall that in an alternative embodiment of the present, the Makyoh server can be embodied in a document processing device 102' such as a printer, or a fax machine, and so on. In one context of FIG. 6A, a user can make a request on his personal server, such as a laptop, or PDA to access a document. In another context, the user can make a similar request on a printer device (or fax machine) to access the document to be printed (or faxed). The device 102' can be configured as a Makyoh server and access the documents in accordance with FIG. 6A, including obtaining the document(s) from another Makyoh server if necessary and distributing the document(s) to other Makyoh servers, in addition to printing or faxing the obtained document(s).

Figure 6B:
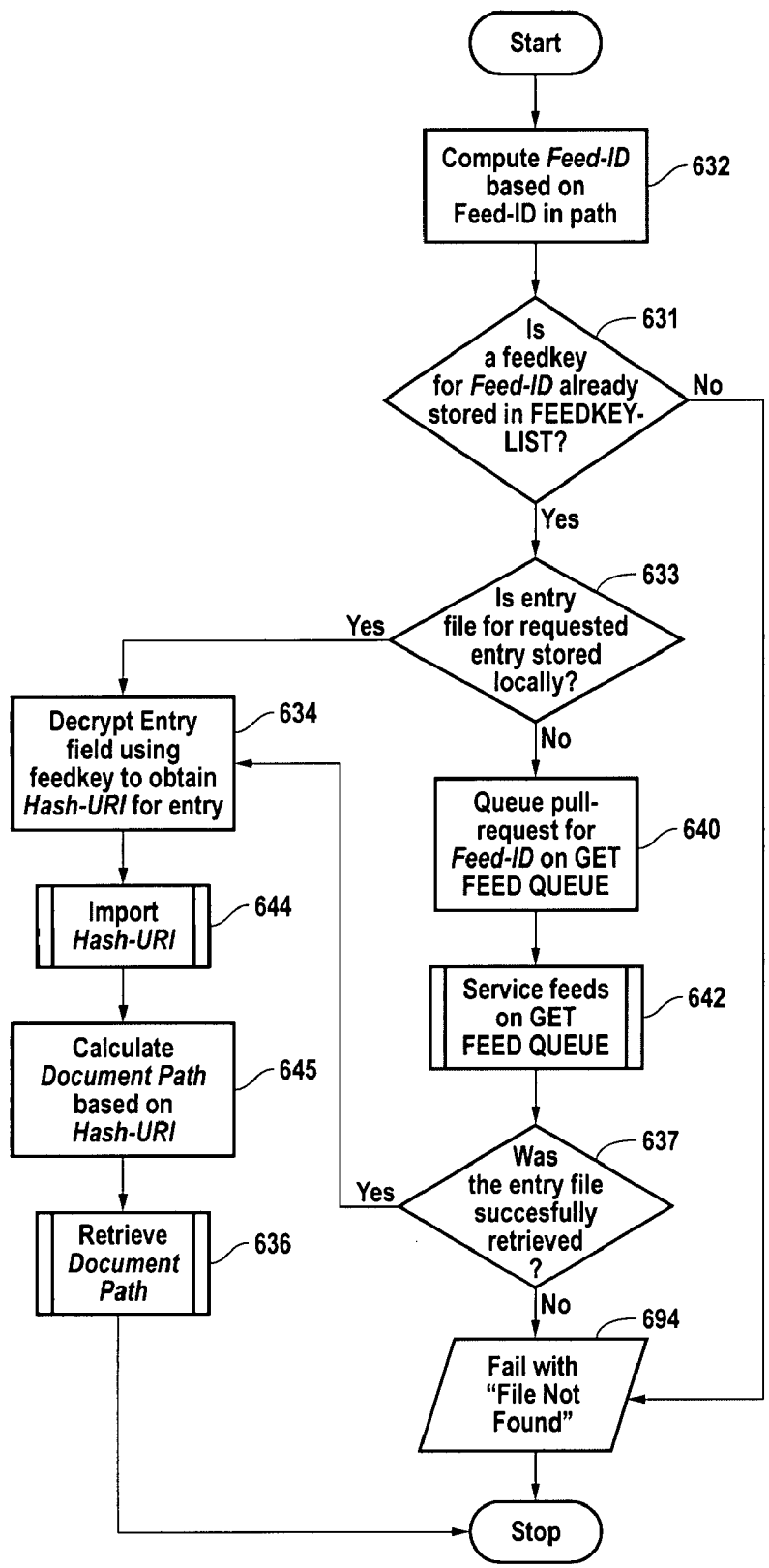
FIG. 6B illustrates the general flow for accessing a feed entry.

Referring to FIG. 6B, the general flow for accessing a feed entry is similar to the flow for accessing a document. As described above, the user would specify a pathname in terms of the archive view presented to a trusted user. In the case of a feed, however, the path for a particular feed entry might look like:

/feeds/2f267747fd8b6212aed119ec05f42bc014f2ed7/20070306T161144Z.bca9e1954824a32b1f8424511b3f01340ffe231b/my-entry.pdf or:

/feeds/a2693f77fd8b6212aed119ec05f42bc014f2ed7/20070215T121022Z.f294e1954824a32b1f842451b3f01340ffe1194/my-entry-dir/images/thumbnail.jpg In a step 632, the feed-Id of the requested feed is determined based on the pathname specified by the requester at the local Makyoh server. In a particular embodiment of the present invention, the feed-Id is the name of the subdirectory 324 (FIG. 3A) in the pathname.

In a step 631, a determination is made whether a feedkey associated with the feed-Id is known. In an embodiment this can be accomplished by maintaining an associative list called the Feedkey List and searching it. The Feedkey List allows the lookup of feedkey files for a particular feed-Id. When the user first logs in with his or her passphrase, the Feedkey List is initialized to contain all feedkeys for which a subscription key or a publication key exists in the user's keyring and for which the associated blob is stored in the user's local repository. The process by which this initialization is discussed in more detail below. A search is performed in the Feedkey List for the feedkey associated with the feed-Id determined from step 632, thus identifying the feedkey file associated with the requested feed. If the feed-Id and associated feedkey is not found, then a suitable response is sent in a step 694 to the requestor indicating that the requested feed was not found.

If the feed-Id is found in the Feedkey List, then a determination is made in a step 633 whether a local copy of an entry file 434 (FIG. 4) for requested feed is stored in the entries directory 414 of the requestor's Makyoh server 102. If the feed-Id is not found in the Feedkey List, then in a step 640 a "pull request" is queued on a Get Feed Queue by placing the feed-Id in the queue in an attempt to obtain the entry file for the requested feed from another ("remote") Makyoh server. In a step 642, the Get Feed Queue is serviced, as will be discussed in more detail below. The feed-Ids in the Get Feed Queue can be serviced with each feed access, or after some predetermined number of feed accesses have occurred, or after a predetermined period of time has elapsed, or based on other suitable criteria, or based on some combination of the foregoing. In an embodiment of the present invention, requests added to the Get Feed Queue expire after a certain amount of time (e.g., one hour), after which they are removed from the queue.

If in a step 637, it is determined that the entry file was successfully retrieved from a remote server and stored in the local storage component 204, then processing proceeds to step 634 discussed below. If it is determined in step 637 that the entry file was not successfully retrieved (e.g., no other Makyoh servers contain the entry file), then a suitable response is sent in step 694 to the requester indicating that the requested document was not found.

If a local copy of the entry file for the requested feed was found (step 633) or a copy of the entry file was retrieved from another Makyoh server (step 637), then in a step 634 the Entry field (506*b*, FIG. 5) is decrypted using the feedkey file retrieved from Feedkey List associated with the requested feed to obtain the hash URI for the file or root directory associated with the requested feed entry. In a step 644, this hash URI is imported into the keyring, to be detailed below. In a step 645, the document path associated with the hash URI is calculated by concatenating the string "/docs/", the Blob-ID specified in the hash URI, the string "/", and the filename specified in the Hash URI. For example, suppose the hash URI is:

hash:
      sha1=c10b555f72d954c8c889c97d357161790e0da4
      a5;aes128-key=82c . . . b163?content-type=application/
      pdf&name=my-document.pdf.

The document path would be:
   /docs/c10b555f72d954c8c889c97d357161790e0da4a5/
      my-document.pdf.

In a step 636, the feed entry is retrieved in the same manner as a document is retrieved in accordance with FIG. 6A described above, including communicating the feed entry to the requester via suitable software; for example to permit viewing and/or editing the document.

2. New Server Join

Every Makyoh server maintains set of servers with which it should share blobs and feed entries, called that server's "neighborhood." Generally speaking, a neighborhood is limited to those servers running Makyoh that can be considered "nearby." For example, in one embodiment of the invention the neighborhood of a given Makyoh server (also referred to as the "local" server) is defined as those other Makyoh servers (also referred to as "remote" servers) that are communicating on the same local subnet as the local server. Note that "nearby" may or may not imply physical proximity. For example, while most servers on a local subnet will likely to be physically near each other, some may be physically remote, for example if they are connected through a VPN (Virtual Private Network). What is important is that distribution is limited to machines that have a higher than average probability of either eventually being able to decrypt the blobs being transmitted, or of themselves redistributing the blobs to a machine that can decrypt them. In this example, users on the same subnet are probably part of the same organization, and are therefore likely to share documents with one another.

Other embodiments might use other criteria for what constitutes a neighborhood. For example, a neighborhood might include both a user's work machine and home machine. As another example, the Makyoh servers of people who regularly communicate via email, instant messaging or phone might be considered neighbors even though they are physically thousands of miles apart and communicate on different subnets. These servers might be in each other's neighborhood, only while communication is in progress (e.g. when the users are communicating over the phone to each other), or might continue to be in each other's neighborhood for some time after communication has ceased.

In an embodiment, a local Makyoh server is notified whenever a machine running Makyoh joins or leaves the local subnet, using an open protocol called Bonjour (generically known as Multicast DNS+DNS Service Discovery). Whenever the local Makyoh server is notified of a new server it automatically determines whether the newly joining server has the blobs and entry files on the Get and Put Blob Queues (using HTTP Head and HTTP PROPFIND requests) and then performs the appropriate push or pull of the files as necessary using HTTP GET and HTTP PUT requests. A similar set of actions is taken for all known servers in the local server's neighborhood whenever a new request is added. The files held on each remote server are cached so requests need not be made more than once per session.

In another embodiment of the invention, a local Makyoh server's neighborhood is defined as the set of servers running Makyoh within a particular organization, as determined by using DNS resource discovery to query that organization's Domain Name Service server for all Makyoh servers running in the organization. In this embodiment, new servers join the neighborhood by using the open DNS UPDATE protocol. In another embodiment, the neighborhood of a local Makyoh server is explicitly set; e.g., through the use of configuration files.

In another embodiment, the neighborhood of a local Makyoh server is defined as the set of other servers running Makyoh with which direct wireless communication can be established (that is, those within wireless range). In this embodiment, new servers join the neighborhood by broadcasting their existence over the wireless channels to any other Makyoh servers within range.

In another embodiment, the neighborhood of a local Makyoh server is defined as the set of machines running Makyoh with which other recent network traffic has recently been communicated. For example, if a user initiated an instant message (IM) chat with another user, each of their personal Makyoh servers would join the other's neighborhood. Their personal Makyoh servers would also join each other's neighborhoods when one user sent email to the other, when one user called the other on the telephone, etc.

In another embodiment, a remote Makyoh server is automatically added to a local server's neighborhood if the remote Makyoh server attempts to initiate a GET or PUT on the local Makyoh server. This embodiment insures that servers using different criteria for a neighborhood will still reciprocate joining each other's neighborhood. Of course, one might also combine different definitions of neighborhood (for example, by including both servers on the local subnet and servers within wireless range) or use multiple definitions for "neighborhood", and one can imagine still other definitions of neighborhood.

A "session" refers to the time from when the local server detects a remote server (e.g., is announced by Bonjour) to the time when the remote server quits its application or otherwise leaves the neighborhood. When a remote server leaves the neighborhood, it has effectively quit (or logged out). All record of the files it held is discarded. This is done, in part, because typically there is no direct way to tell whether a new server that is being announced is one that had been previously known to the local server. Servers typically do not have unique IDs, and server IP addresses may change (for example, in the case of DHCP—dynamic host configuration protocol).

Figure 7A:
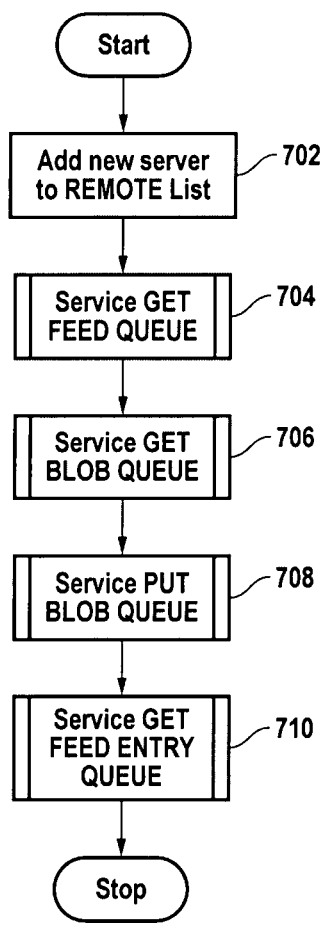
FIGS. 7A and 7B illustrate the general flow for handling new server joins and removals.

FIG. 7A shows the basic steps for processing the detection of a new server (the newly joined server). First, the new server is added to a REMOTE list, step 702, stored in the server that detects the newly joined server. This list will be used in service routines to be discussed below. Then, in steps 704 and 706, service routines are performed to service the Get Feed Queue and the Get Blob Queue to obtain feed entries and blobs from the newly joined server. Then in steps 708 and 710, service routines are performed to service the Put Blob Queue and the Put Feed Queue to distribute the documents obtained from the newly joined server to those servers that have previously been detected. In an alternative embodiment, a single REMOTE List can be stored in a commonly accessible place (e.g., DNS server) that can be updated and accessed by servers in the "neighborhood".

FIG. 7A describes a process whereby a Makyoh server in a neighborhood is notified by the joining server. Alternatively, each server in a neighborhood can be informed of the joining server by itself. For example, a server may have a digital camera that monitors for the physical presence of other servers. The server can capture images periodically, and by analyzing the images determine that a new server has joined the neighborhood. Though simplistic, this example points out that the joining server need not broadcast its presence; the idea it that servers in a neighborhood can be informed or otherwise become aware of newly joining servers, and in response to take the steps described in FIG. 7A.

Figure 7B:
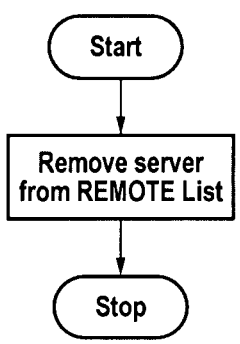

FIG. 7B shows that when a server "leaves" a group of server, then those servers that remain in the group will detect this and each will remove the leaving server from its REMOTE list. In a particular embodiment, detection by the remaining servers of a leaving server is handled entirely by the Bonjour protocol. Basically when a server quits or leaves the network, it sends out a multicast or broadcast message announcing its departure. The remaining servers can take appropriate action upon receiving such messages.

3. Import Key

Figure 8:
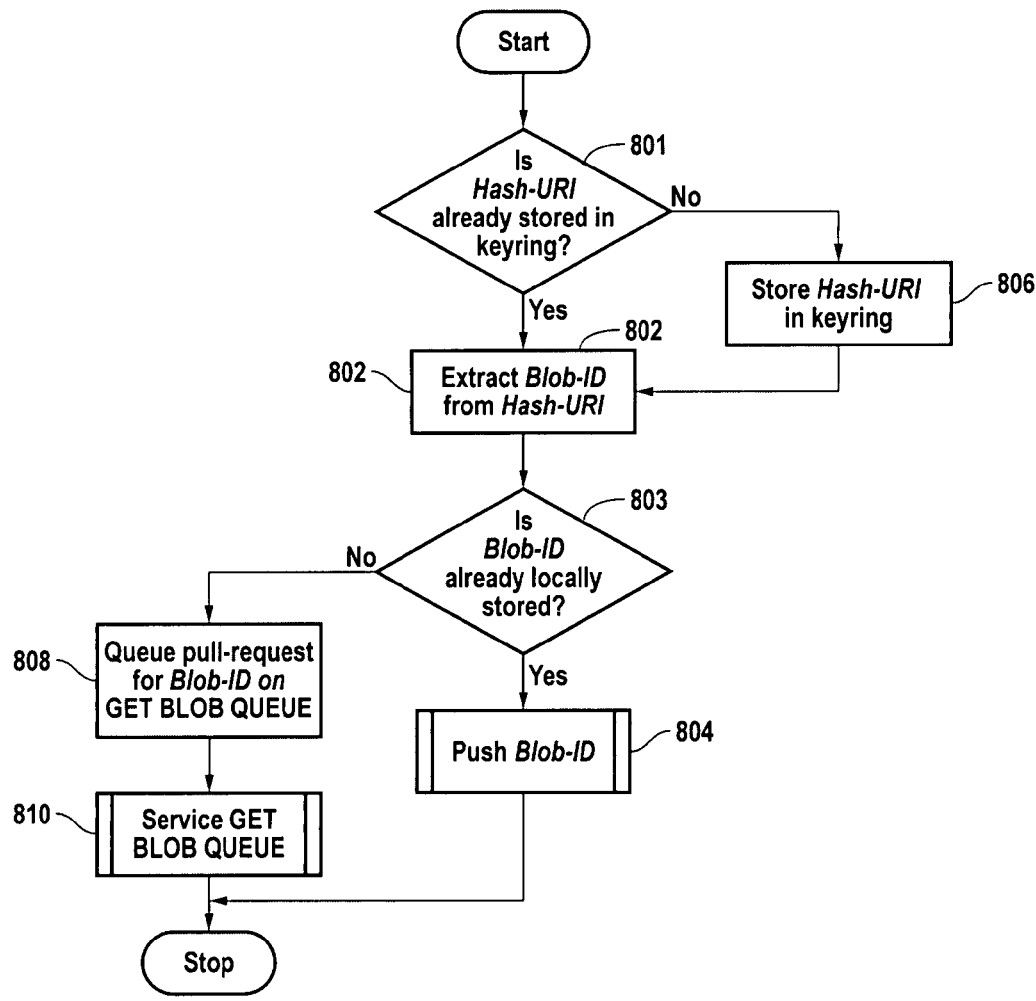
FIG. 8 illustrates the general flow for importing hash URI's.

FIG. 8 shows the processing that occurs when a hash URI is imported. Recall, that the hash URI provides the decryption key for decrypting a stored encrypted blob or feedkey (which itself is a blob). When a server (receiving server) receives a hash URI, a determination is made in a step 801 whether the received hash URI is already stored in the receiving server. If not, then the received hash URI is stored in the storage 204 of the receiving server (step 806). Processing will proceed to a step 802 where the blob-Id is obtained from the hash URI. A determination is made in a step 803 whether a copy of the blob associated with the blob-Id is already contained in the receiving server. If there is a copy, then the push blob service is performed in a step 804 as described in FIG. 13. As will become clear from the explanation of FIG. 13, this will cause copies of the blob to be distributed to other remote servers, if it is already stored in the receiving server. If a copy of the blob associated with the blob-Id is not already contained in the receiving server (step 803), then the blob-Id is queue on the Get Blob Queue in a step 808, and the Get Blob Queue is serviced per FIG. 10 in a step 810.

In the usage scenario above, Alan's laptop had replicated his encrypted strategy outline onto Bob's laptop. If a new user, Carl, had joined the group subsequent to replication of the encrypted strategy outline by Alan's Makyoh server, then Carl will not have a copy. However, when Alan later gives Bob his key (hash URI), for example by scanning a barcode, then Bob will "import" Alan's key and by so doing, Carl will receive a copy of the encrypted strategy outline by operation of the processing described in FIG. 8. Carl would then need only obtain the key from Alan, or even Bob.

Now, suppose that Dan enters the group. He does not have a copy of Alan's encrypted strategy outline. Suppose further that no one has imported Alan's key within the last hour (assuming blob-Ids are removed from the queue after one hour, "stale" ids are discussed below) since Dan's joining the group. As will be explained below, stale ids are removed from the queues. What this means for Dan, is that when he joins, Alan's server will not send a copy of the outline because the id in Alan's Put Blob Queue will have been deleted. Nonetheless, Dan can still obtain a copy of Alan's outline simply by importing Alan's key after logging in, and per the processing of FIG. 8 a copy of the outline will be replicated on Dan's Makyoh server.

4. Blob Services

Figure 9A:
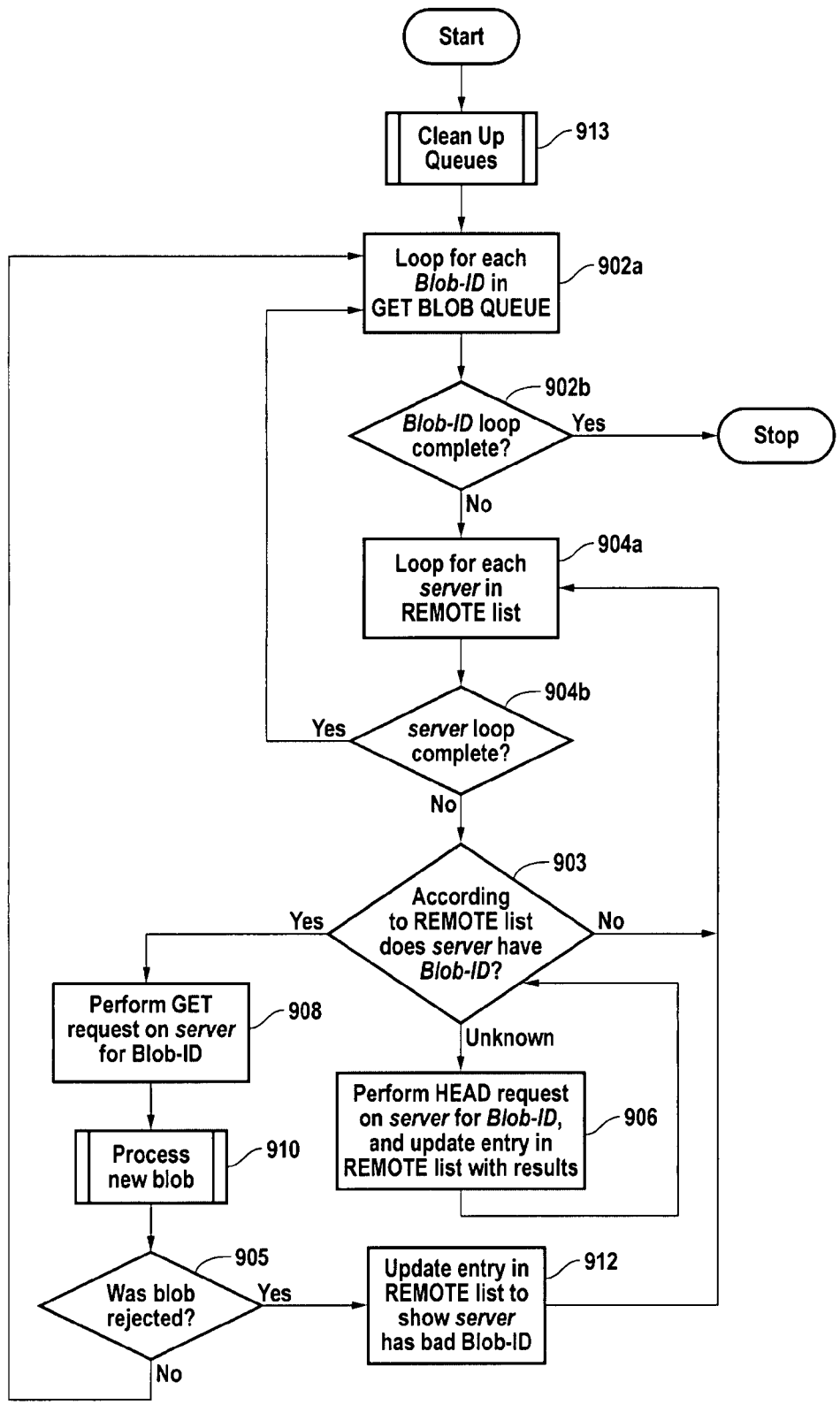
FIG. 9A illustrates the general flow for servicing the Get Blob Queue.

FIG. 9A shows the processing for servicing the Get Blob Queue on the local Makyoh server. The local Makyoh server will queue up a list of blob-Ids for subsequent servicing whereby blobs associated with the blob-Ids are retrieved from other (remote) Makyoh servers and stored in the storage 204 of the local Makyoh server. In a particular embodiment of the present invention, stale blob-Id's in the Get Blob Queue are removed in a step 913, which will be discussed in more detail below in FIG. 14. Steps 902a, 902b represent an outer loop to process each blob-Id on the Get Blob Queue. For each blob-Id, an inner loop 904a, 904b is processed for each Makyoh server in the REMOTE list, as managed in accordance with FIGS. 7A and 7B, for example. Thus, for each candidate server in the REMOTE list, a determination is attempted in a step 903 whether the candidate server has the blob-Id. If the determination cannot be made, then in a step 906 a HEAD request is performed on the candidate server to inquire whether it contains the blob-Id. If in step 903 it is determined that the candidate server does not contain the blob-Id, then the next server in the REMOTE list is considered (steps 904a, 904b).

If it is determined in step 903 that the candidate server does contain the blob-Id, then in a step 908 a GET request is performed on that server to obtain the corresponding blob (the new blob). The new blob is serviced in a step 910, additional details of which will be discussed below. A determination is made in a step 905 whether the new blob was rejected or not. If the new blob was rejected, then in a step 912 that candidate server is marked as not having the blob, so that in step 903 the NO branch will be taken for this server. If the new blob is not rejected, then processing continues with the next blob-Id in the Get Blob Queue (steps 902a, 902b).

Figure 9B:
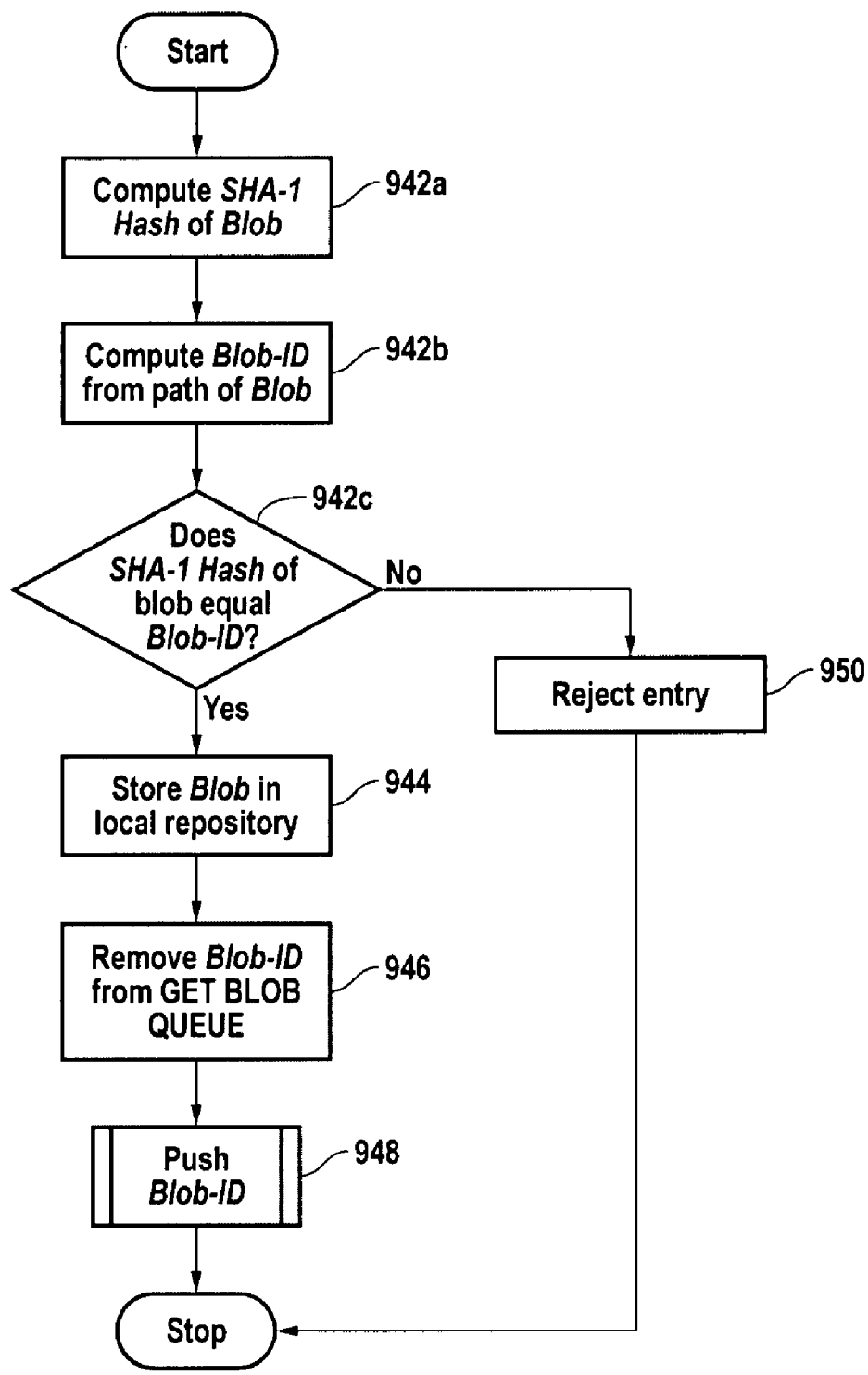
FIG. 9B illustrates the general flow for processing newly received blobs.

FIG. 9B describes processing of a new blob by the local Makyoh server (i.e., the server receiving the new blob). An initial verification is performed by computing the SHA-1 hash of the blob contents (step 942a), computing blob-Id specified in the path to which the blob is being written (step 942b), and then comparing the two (step 942c). It should be observed that this verification can be performed even if the local server does not have the ability to decrypt the blob in question. If there is no match, then it is assumed that the new blob is somehow corrupted and it is rejected in a step 950 and not stored in the local archive.

If there is a match, then in a step 944 the blob is stored in subdirectory 412 with the blob-Id as the blob's filename in the storage 204 of the local server. In a step 946, any requests for blob-Id are removed from the Get Blob Queue. In a step 948, a push blob service is performed, as described in FIG. 13 below. As will become apparent, in this context the push blob service will serve to distribute (push) the received blob to other Makyoh servers (e.g., 104-108). Thus, in the embodiment where a device 102' such as a printer or fax is configured as a Makyoh server, if the documents had to be obtained from another server, the documents will be distributed to other Makyoh servers by operation of servicing the Get Blob Queue.

Figure 10:
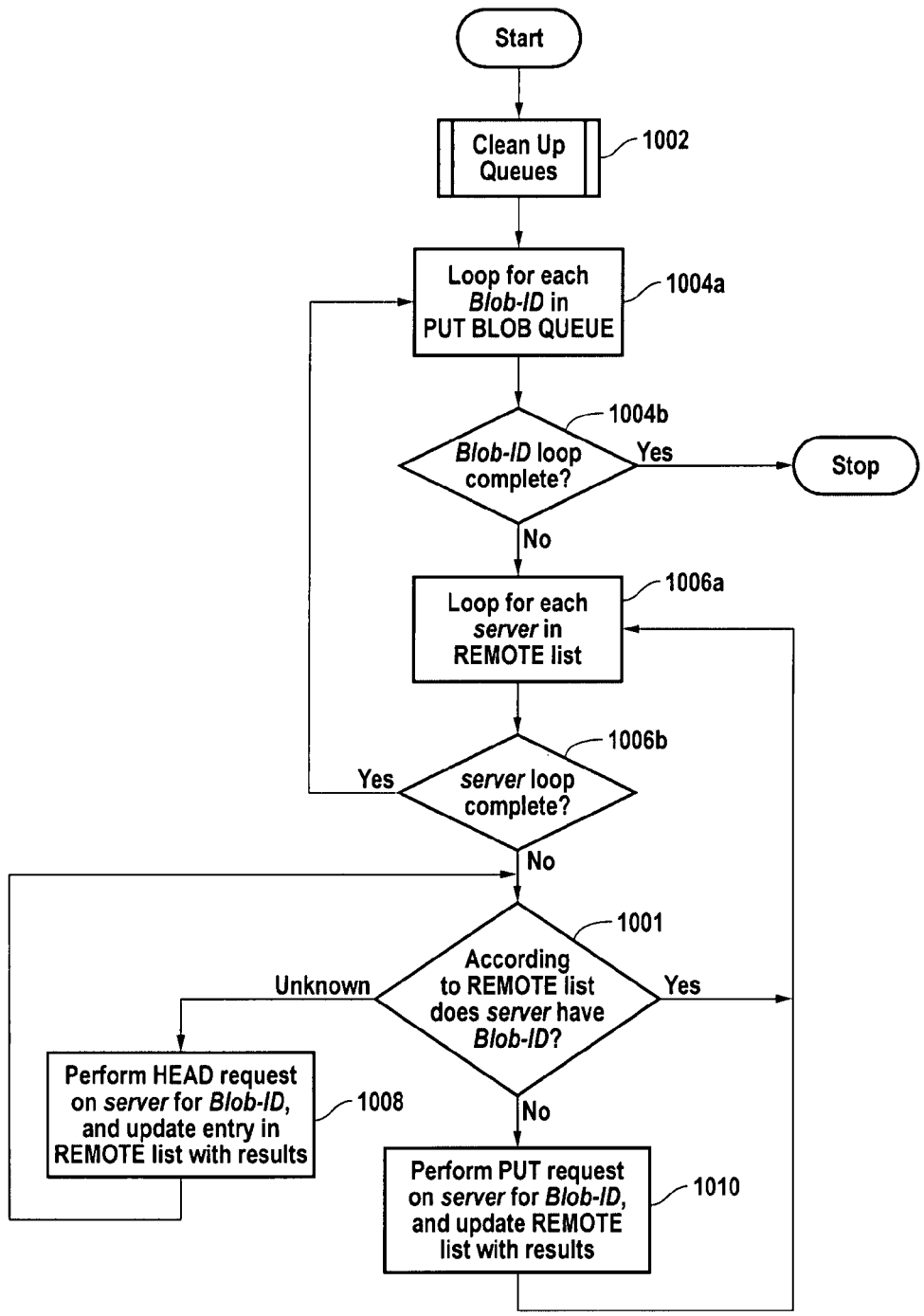
FIG. 10 illustrates the general flow for servicing the Put Blob Queue.

FIG. 10 shows processing for servicing the Put Blob Queue. The blob-Ids on the Put Blob Queue of the local Makyoh server identify blobs stored on the local server that are to be distributed to the other servers. In a particular embodiment of the present invention, stale blob-Id's in the Put Blob Queue are removed in a step 1002, per FIG. 14. Steps 1004a and 1004b represent an outer loop to process each blob-Id on the Put Blob Queue. For each blob-Id, an inner loop 1006a, 1006b is processed for each Makyoh server in the REMOTE list. Thus, for each target server in the REMOTE list, a determination is attempted in a step 1001 whether the target server already has the blob-Id. If the determination cannot be made, then in a step 1008 a HEAD request is performed on the candidate server to inquire whether it contains the blob-Id. If in step 1001 it is determined that the target server already contains the blob-Id, then the next server in the REMOTE list is considered (steps 1006a, 1006b).

If it is determined in step 1001 that the target server does not contain the blob-Id, then in a step 1010 a PUT request is performed on that server to send the corresponding blob to that server. Processing then continues with the next target server in the REMOTE list (steps 1006a, 1006b). When every server is processed, then processing continues with the next blob-Id in the Put Blob Queue (steps 1004a, 1004b).

5. Feed Services

Figure 11A:
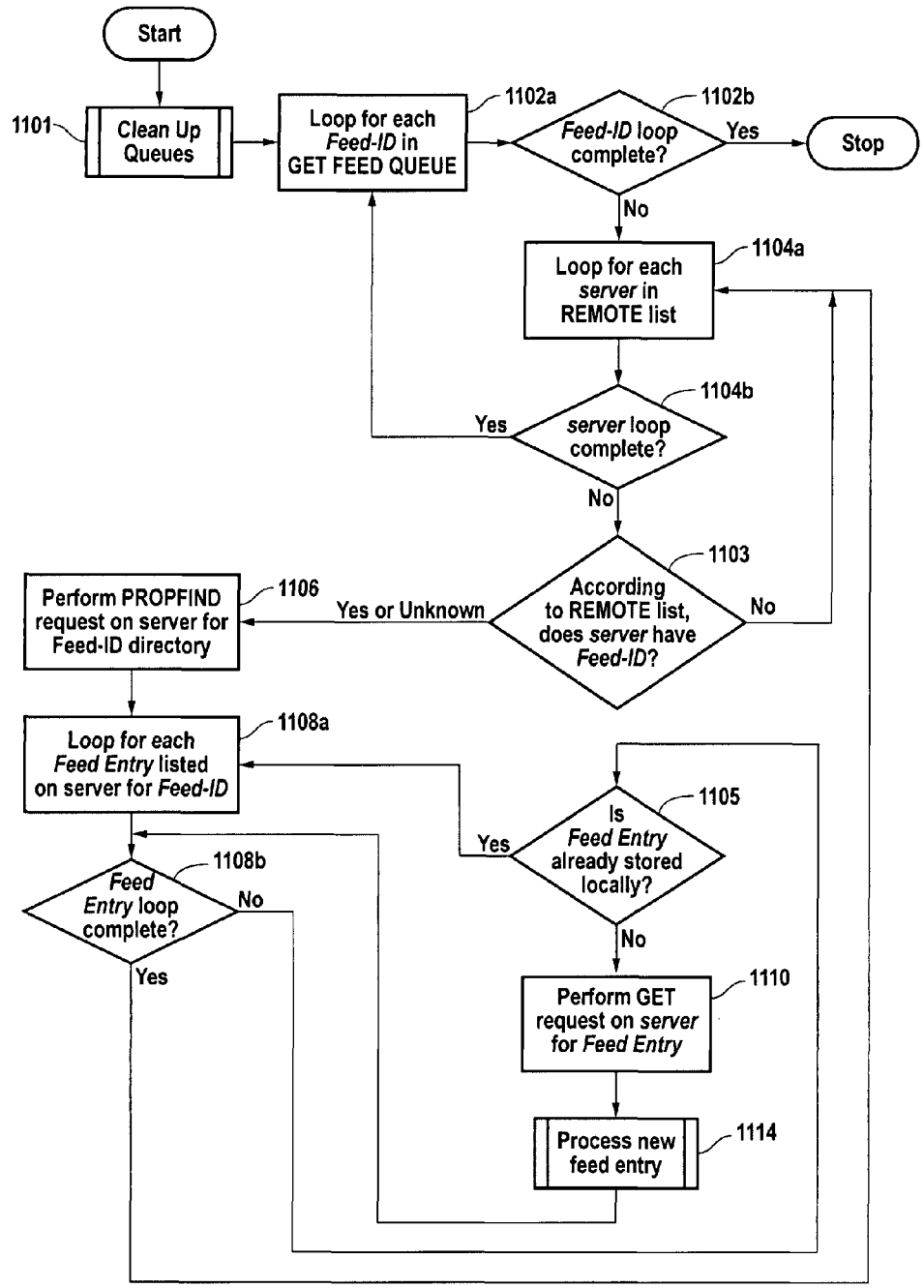
FIG. 11A illustrates the general flow for servicing the Get Feed Queue.

FIG. 11A shows the processing for servicing the Get Feed Queue. This is the same idea as in the servicing of GET requests for blobs. Basically, the local Makyoh server will queue up a list of feed-Ids for subsequent servicing whereby feed entry files associated with the feed-Ids are retrieved from other (remote) Makyoh servers and stored in the storage 204 of the local Makyoh server. A Get Feed Queue contains a list of feed-Ids that are to be serviced by one or more GET requests by the local server. In a particular embodiment of the present invention, stale feed-Id's in the Get Feed Queue are removed in a step 1101, per FIG. 14. Steps 1102a and 1102b represent an outer loop to process each feed-Id on the Get Feed Queue. For each feed-Id, an inner loop 1104a, 1104b is processed for each Makyoh server in the REMOTE list. Thus, for each candidate server in the REMOTE list, a determination is attempted in a step 1103 whether the candidate server has the feed-Id. If it is determined that the candidate server does not contain the feed-Id, then the next server in the REMOTE list is considered (steps 1104a, 1104b).

If in step 1103 it is determined that the target server contains the feed-Id or that the determination cannot be made, then in a step 1106 a PROPFIND request is performed on the candidate server to obtain a directory listing of that candidate server's feed-Id directory 424 (FIG. 4). Steps 1108a and 1108b are iterated for each feed entry file 434 (see also 506a in FIG. 5) that is listed in the candidate server's directory 424. Thus, in a step 1105 a determination is made whether a candidate feed entry file in the list is already stored locally. If so, then the next feed entry file in the list is processed (steps 1108a, 1108b).

If the local Makyoh server does not already have a copy of the candidate feed entry file, then in a step 1110 a GET request is performed on the candidate server to obtain a new feed entry file for the local server. The new feed file is processed in a step 1114, which will be discussed shortly. Processing then continues with the next feed-Id in the Get Feed Queue (steps 1102a, 1102b).

Figure 11B:
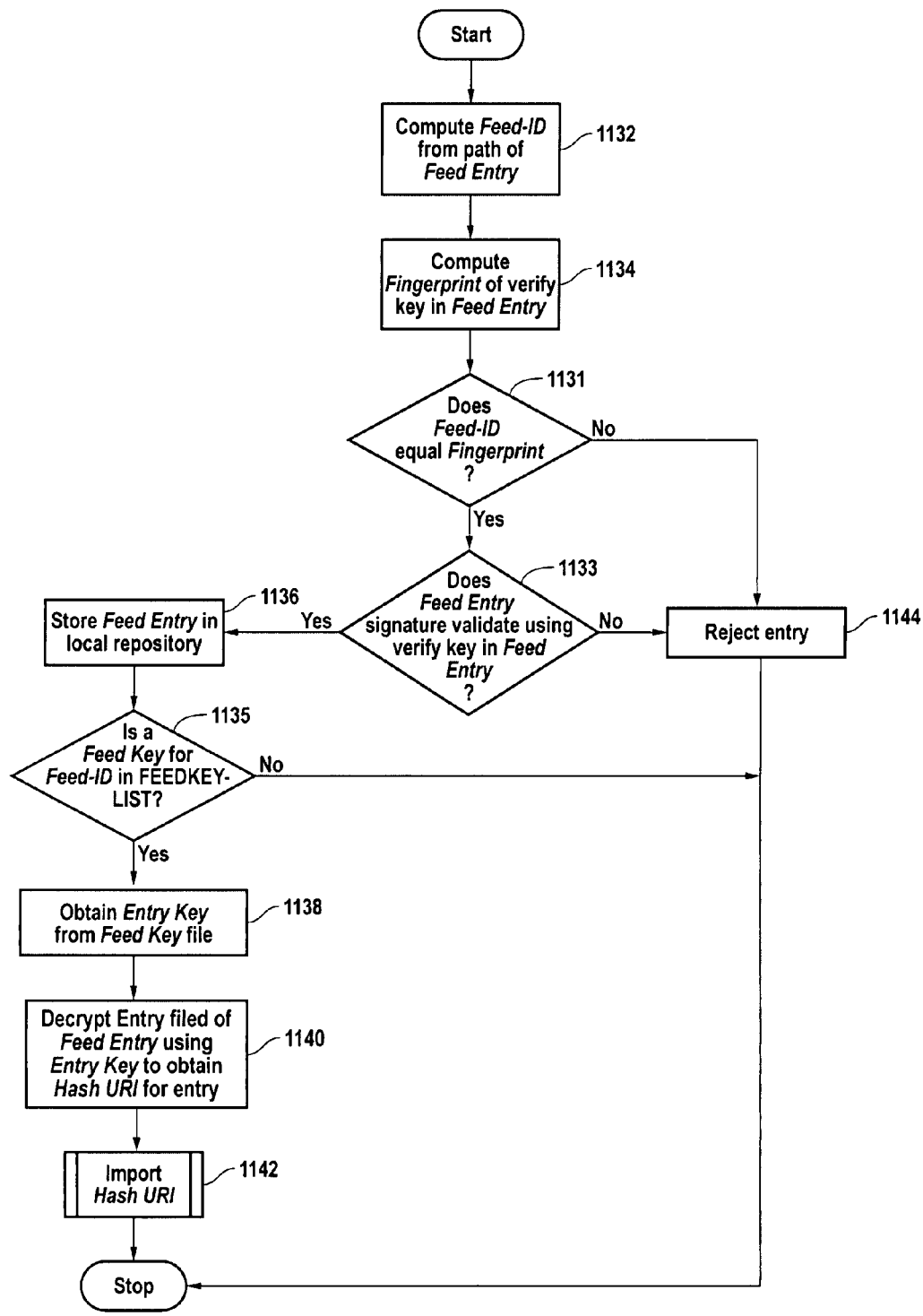
FIG. 11B illustrates the general flow for processing new feed entries.

FIG. 11B describes processing of new feed entries. In a step 1132, the feed-Id is computed from the feed entry. In a step 1134, the fingerprint of the verify key in the feed entry is computed. A determination is made in a step 1131 whether the feed-Id matches the fingerprint, and if not then the new feed entry is assumed to be somehow corrupted and rejected in a step 1144. If there is a match then a determination is made in a step 1133 whether the signature field of feed entry is a valid signature of the rest of the feed entry's contents, given the verify-key specified in the feed entry as the signor's public key. If the signature on the feed entry is not validated, then the feed entry is rejected.

A validated feed entry is stored in step 1136 in the storage of the local server. If the feed key is for a feed-Id in the Feedkey list (step 1135), then the entry key is obtained from the feed key file in a step 1138. In a step 1140, the "entry" field of the Feed Entry is decrypted using the entry key to obtain its hash URI, which is then "imported" in a step 1142 in the manner shown in FIG. 8.

Figure 12:
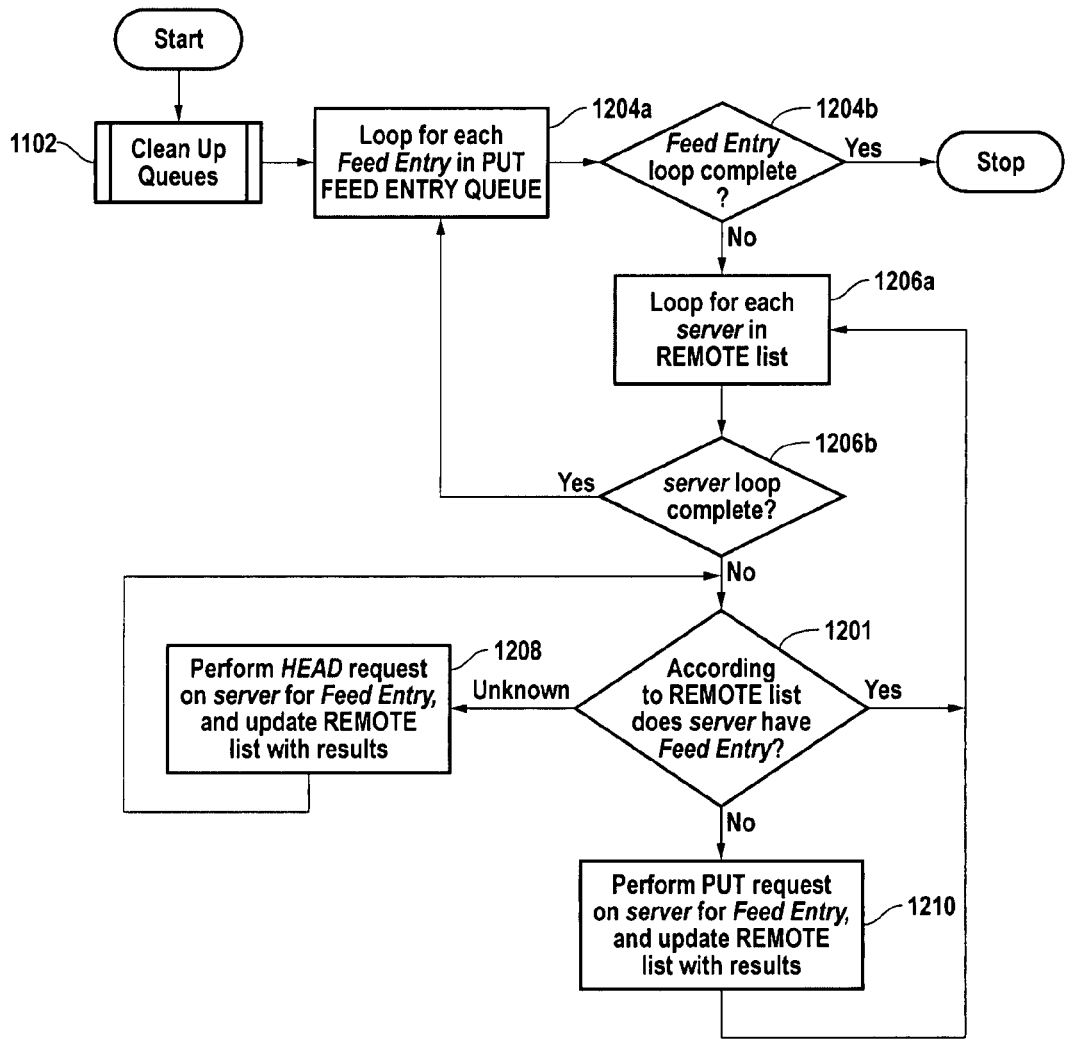
FIG. 12 illustrates the general flow for servicing the Put Feed Entry Queue.

FIG. 12 shows the processing for servicing the Put Feed Entry Queue. In a particular embodiment of the present invention, stale feed-Id's in the Put Feed Entry Queue are removed in a step 1202, per FIG. 14. Steps 1204a, 1204b represent a loop that is performed for each feed entry in the Put Feed Entry Queue. For each feed entry, an inner loop represented by steps 1206a, 1206b is performed for each target server in the REMOTE list. Thus, at step 1201 a determination is made whether a target server already has the feed entry. If so, then the next server is considered, steps 1206a, 1206b. If it is unknown whether the target server contains the feed entry, then in a step 1208 a HEAD request is made to determine if that server has a copy of the feed entry in its storage. If the target server does not have a copy of the feed entry, then a PUT request is performed in a step 1210 to place a copy of the feed entry in that server, along with updating the REMOTE list to indicate that it has a copy of the feed entry.

Referring to FIG. 13, in a step 1301 a request to push the blob to other servers is queued by adding blob-Id to the Put Blob Queue. A determination is made in a step 1302 whether a hash URI corresponding to the blob-Id is in the local server's keyring. In one embodiment of the invention this determination is accomplished by searching each key file 326 and comparing the blob-Id part of the enclosed hash URI to the blob-Id being pushed. In another embodiment the keyring is stored in a temporary database which allows fast lookup of hash URIs based on their blob-Id component. If an appropriate hash URI is not found in step 1302, then in a step 1312 the Put Blob Queue is serviced in accordance with processing shown in FIG. 9A, and the processing is complete.

Returning to step 1302, if an appropriate hash URI is found then in a step 1303 the blob contents are decrypted using the key specified in the hash URI. A determination is made in a step 1304 whether the blob is a feedkey. This determination is made by examining the blob type, as specified in the blob's header.

If the blob is of type feedkey then in a step 1305 the feed-Id of the feed corresponding to that feedkey is obtained by calculating the fingerprint of the feedkey's verify-key, e.g. by using the known method specified in the OpenPGP standard. The feedkey is then associated with the calculated feed-Id in the Feedkey List in a step 1306. Then in a step 1307 a request to retrieve any new feed entries from other servers is queued by adding the feed-Id to the Get Feed Queue. The Get Feed Queue is then serviced in a step 1308 in accordance with processing shown in FIG. 11A. Then in a loop represented by steps 1309a and 1309b, a number of locally-stored feed entries associated with feed-Id are determined by listing the directory 424 associated with feed-Id. The number of locally-stored feed entries so listed is determined by a configuration parameter, and may include all, none, or some number of such entries. If the number so listed is less than the number of entries locally stored for the feed-Id then the most recent entries are listed, as based on the timestamp in the feed entry's filename 434. The feed entries determined in steps 1309a and 1309b are then queued to be pushed to other servers 104-108 in a step 1310 by adding each feed entry's path to the Put Feed Entry. Once all listed entries are added, the Put Feed Entry Queue is serviced in a step 1311 in accordance with FIG. 12. The Put Blob Queue is then serviced in a step 1312 in accordance with FIG. 10, and the processing is complete.

Returning to step 1304, if the blob is not of type feedkey then another determination is made in step 1313 whether the blob is a directory by examining the blob type, as specified in the blob's header. If the received blob is not a directory (e.g. if it is a normal content file, of type "blob"), then the Put Blob Queue is serviced in a step 1312 per FIG. 10, and the processing is complete. Returning to step 1313, if the blob is of type directory, then a loop is performed over each hash URI listed in the directory blob (steps 1314a and 1314b), in which each hash URI is imported in a step 1315 in accordance with FIG. 8. Once the loop over the directory's listed hash URIs is complete, the Put Blob Queue is then serviced in a step 1312 per FIG. 10, and the processing is complete.

Figure 14:
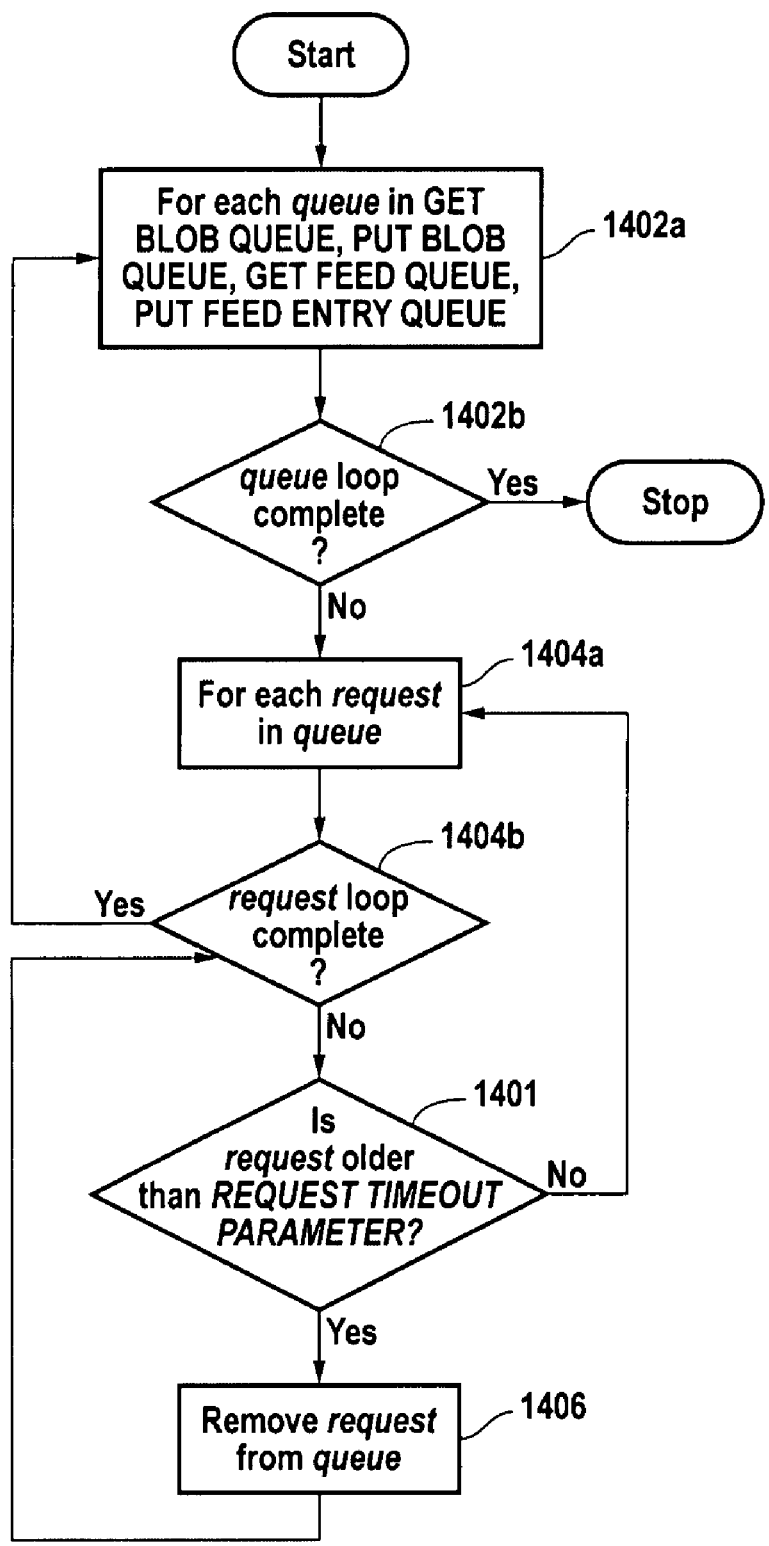
FIG. 14 illustrates the general flow for handling stale queue entries.

FIG. 14 describes the utility for handling stale entries in the various queues. Thus, the loop 1402a, 1402b is iterated for each queue (Get Blob Queue, Put Blob Queue, Get Feed Queue, and Put Feed Entry Queue). For each queue, each request in that queue is considered in the loop 1404a, 1404b. For each request, a determination is made in a step 1401 whether it has been on that queue for a period of time greater than a timeout parameter. Each queue can have its own timeout parameter, or as shown in the figure a single parameter can be used. If the request is "old", then it is removed from that queue.

6. User Login

Figure 15:
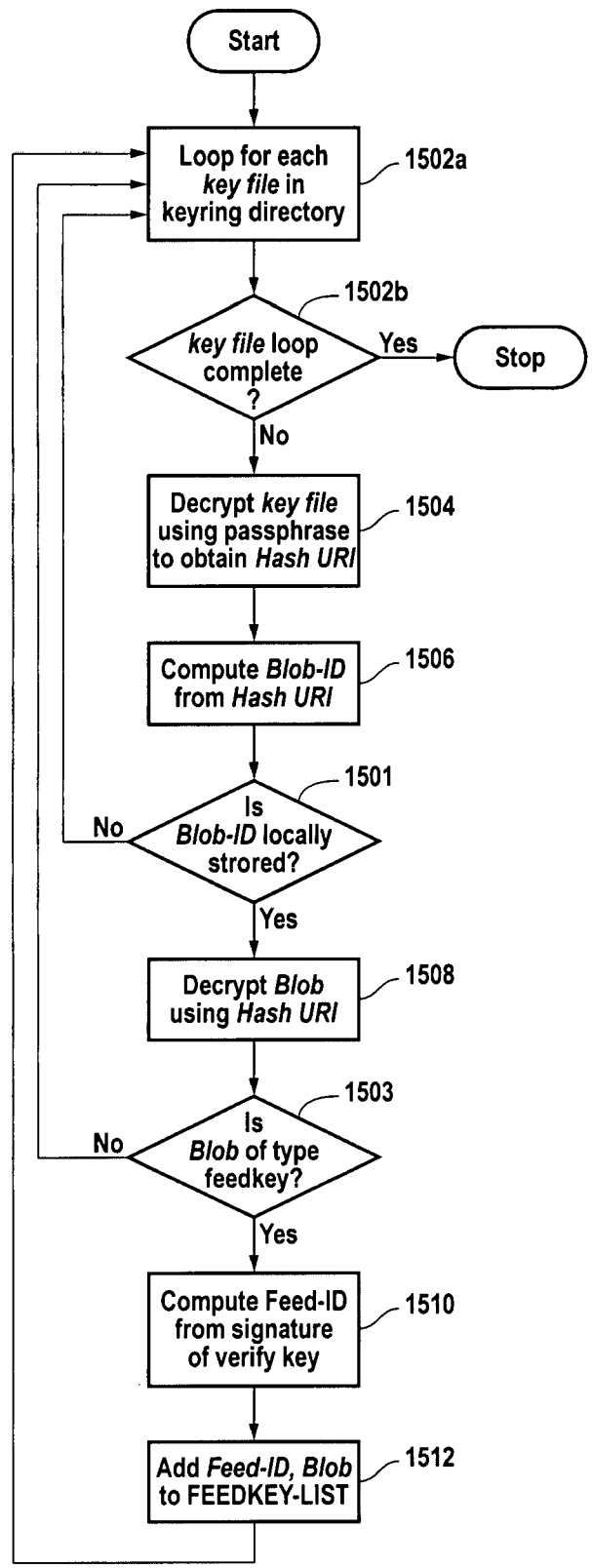
FIG. 15 shows the process flow for a user login.

FIG. 15 describes steps performed when a user logs in. The actual login sequence can be in any suitable form. The user can be presented with a login screen, which typically involves entering username and a password. Implied login can occur when the user's Makyoh server joins a group of servers, that event of joining the group can constitute logging in. For example, suppose a joining server enters within detection range of an existing group of servers. The existing servers as well as the joining server can detect this occurrence, for example as discussed in FIG. 8. The joining server can then initiate login processing described in FIG. 15. Implied login can also simply occur on start-up of the Makyoh server, or upon making the first request for a path initiated on the local server.

Login processing includes steps 1502a, 1502b which define a loop that is performed on a local directory of encrypted key files stored on the physical local disk of the server. This directory is in a private, local configuration directory—it's not distributed over either the trusted API or the remote API. Each file contains one key in the keyring, encrypted using the user's passphrase. Recall that the directories in FIG. 3 are virtual, and thus only shown to the trusted local user. The virtual key files 326 are presented as plaintext, and are intended as an easy way for him to access his keys so he can give them to someone else. The keyring directory 316 is also only available *after* the user logs in, and thus can't be looped during login.

For each of the user's key files 326, the key file is decrypted in a step 1504 using the user's passphrase in order to access its contents, namely, the hash URI. In a step 1506, the blob-Id is obtained from the hash URI. If in a step 1501 it is determined that the blob associated with the obtained blob-Id is not locally stored (i.e., stored in the user's server), then the next key file 326 in the user's keyring 316 is processed (steps 1502a, 1502b). The determination uses the "type" field in the header part of the decrypted blob, discussed above in the "Blob file format" section.

If in step 1501 it is determined that the blob associated with the obtained blob-Id is locally stored, then the blob is decrypted in a step 1508 using the decryption key obtained from the hash URI to obtain cleartext content. If in a step 1503 it is determined from the cleartext content that the blob is a file, then the next key file 326 in the user's keyring 316 is processed (steps 1502a, 1502b).

If in step 1503 it is determined from the cleartext content that the blob is a feedkey, then the feed-Id is obtained in a step 1510 from the signature of the verify-key. The feed-Id and the blob are then added to the Feedkey List in a step 1512. Processing then continues with the next key file 326 in the user's keyring 316 (steps 1502a, 1502b).

7. Publish

New files and directories are created in Makyoh in a scratch directory 344a using standard WebDAV methods (in particular, PUT, COPY, DELETE, MOVE and RENAME). These files and directories are only accessible locally, and are not distributed to other Makyoh servers. To make the contents of scratch directories available to other servers they must first be "published" by executing an HTTP GET request for the path to be published with the query parameter "op=createdoc". The Makyoh server will then ensure that blob files associated with each file and directory being published are made available to remote servers in subdirectory 412, import the associated hash URI(s) into the local keyring, and push associated blobs out to known remote servers.

Figure 16A:
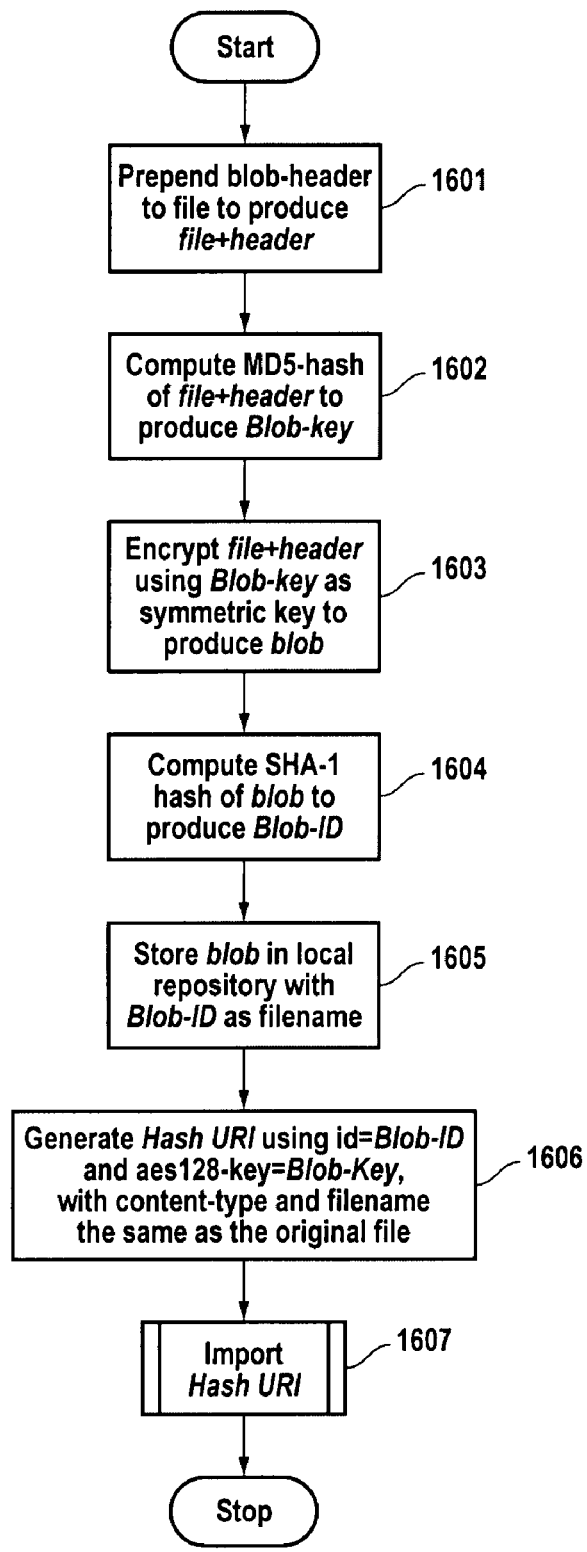
FIG. 16A illustrates the process for adding a file to the archive.

Referring to FIG. 16A, when a file is published in a step 1601 a blob header consisting of the file's length, the file's type ("blob" or "feedkey") and an optional salt, is prepended to the file, and a blob-key is determined in a step 1602 by computing the MD5 hash of the resulting prepended file. The prepended file is then encrypted in a step 1603 using the blob-key as a symmetric key, for example using the known Advanced Encryption Standard (AES-128), to produce the "blob" (blob file). The "blob-Id" is then calculated in a step 1604 by computing the SHA-1 hash of the resulting encrypted blob file. Then in a step 1605 the blob is stored in subdirectory 412, using the calculated blob-Id as its filename. The "hash URI" is then generated for the blob in a step 1606 by concatenating the text "hash:id=", the blob-Id, ";aes128-key=", the blob-key, "?content-type=", the MIME-type of the file being published, "&name=", and the filename of the file. This hash URI is then imported into the keyring in a step 1607 per processing described in FIG. 8. As discussed above, this service will cause the newly added file to be distributed.

In the context of a user's laptop or PDA or similar device, the user creates the document or otherwise receives a new document. If the user desires to add it to his Makyoh archive then he can invoke the process described in FIG. 16A. In the context of a document handling device 102' (FIG. 1A) such as a printer, or a fax, or a scanner, a user or another machine can send a document to the device to be printed or faxed, or the user may place thd document on the scanner to be scanned. If the device 102' is also configured as a Makyoh server, the received document can be viewed as a new document and trigger the process of FIG. 16A to incorporate the received document in the device's Makyoh archive, and also distribute the received document to other Makyoh servers.

The device 102' would receive unencrypted image or file data. The device 102' would then publish the document, store the encrypted blobs locally and give the user a key to decrypt the document (e.g. in the form of a 2D barcode). In an embodiment of the present invention, the device 102' would not store the key locally (or indeed have a keyring at all)—that way the data remains completely secure.

Figure 16B:
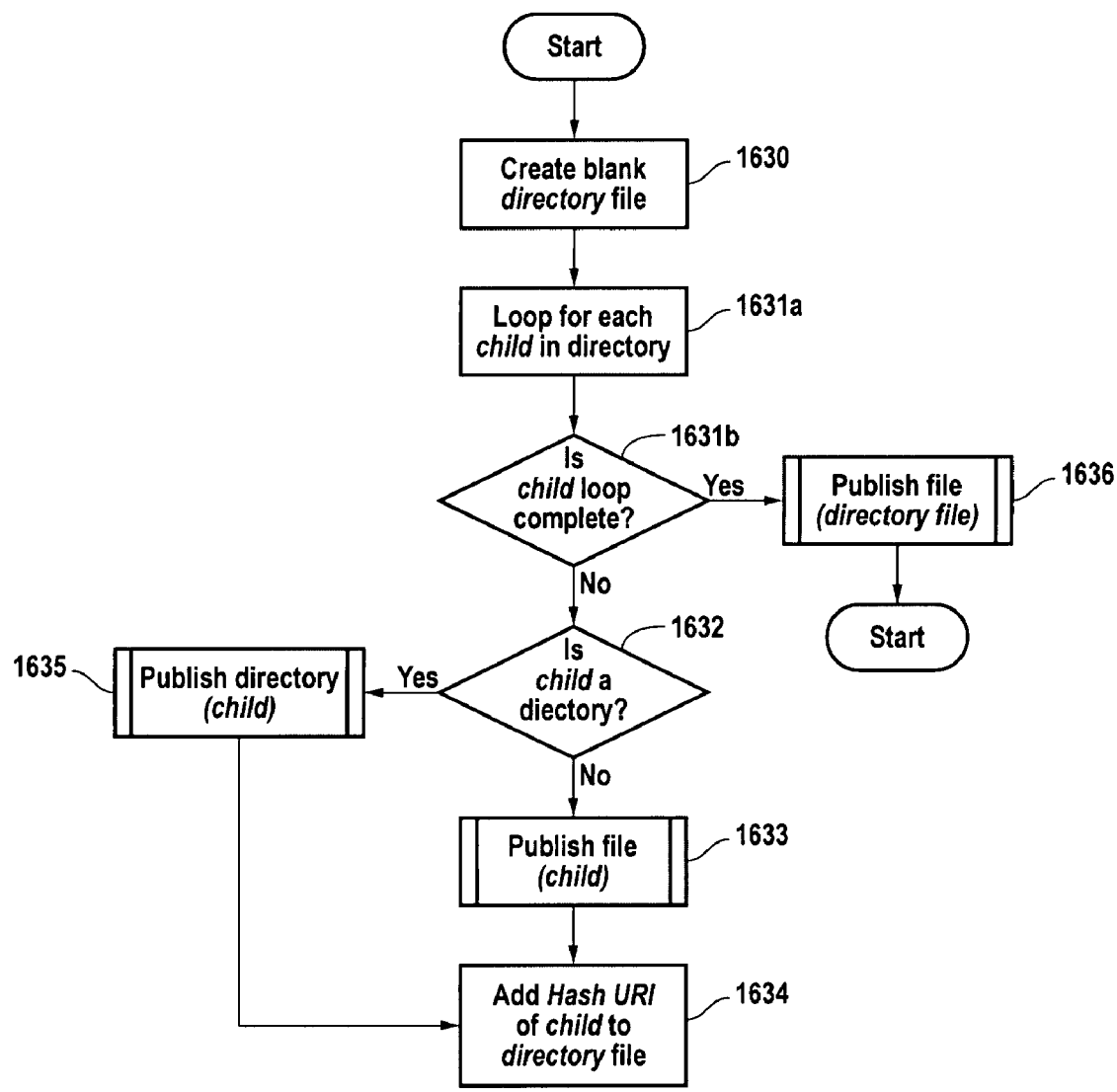
FIG. 16B illustrates the process for adding a directory to the archive.

Referring to FIG. 16B, when a directory is published a blank directory file is created in step 1630. Then each child (that is, each file or subdirectory) is processed in a loop (steps 1631*a* and 1631*b*) in which first a determination is made in step 1632 whether the child is a directory. If the child is not a directory (i.e. if it is a file) then in step 1633 child is published by the method described above and in FIG. 16A. The resulting hash URI is then added in step 1634 to the directory file created earlier. If in step 1632 the child is determined to be a directory then the child is published in step 1635 by recursively applying the method described here, after which the resulting hash URI is added in step 1634 to the directory file created earlier. Once all files and subdirectories in the published directory are processed, the loop completes (step 1631*b*) and the directory file created earlier is published in a step 1636 by the method described above and in FIG. 16A.

Figure 16C:
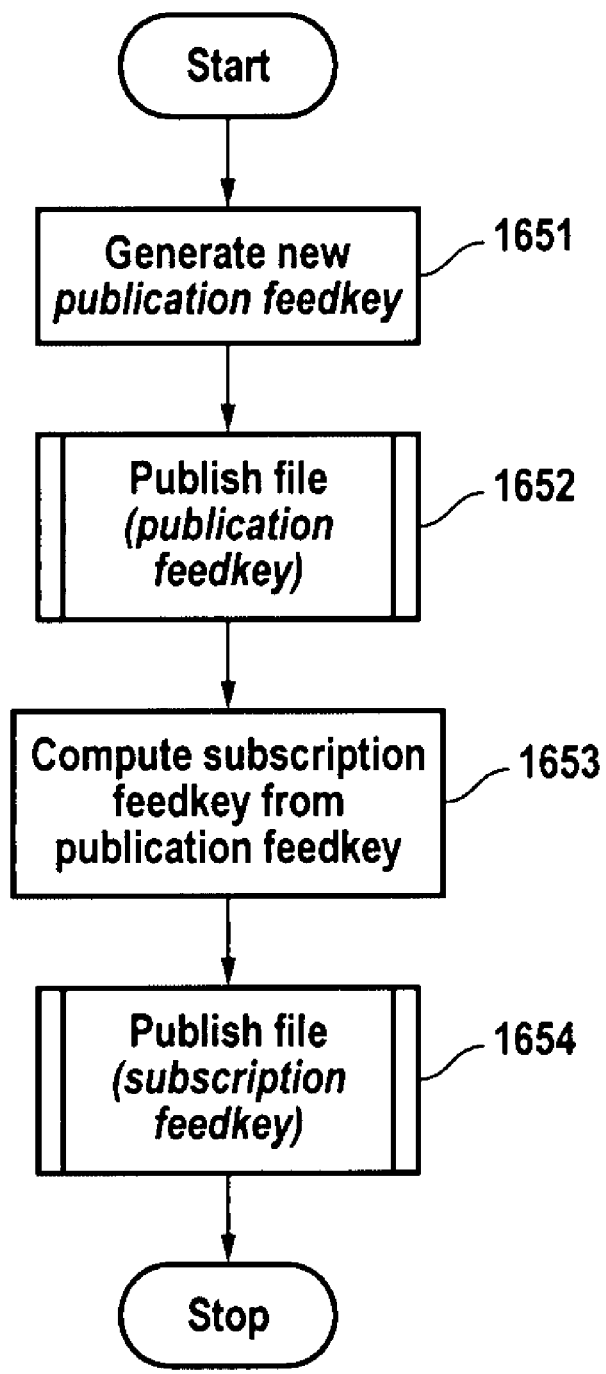
FIG. 16C illustrates the process for creating a feed.

A feed must be created before any entries can be published to it. Feed creation is accomplished in one embodiment of the invention by executing an HTTP GET request with the query parameter "op=create", which will generate feedkeys for the new feed and then publish those feedkeys. Referring to FIG. 16C, a new publication feedkey 506 is generated in step 1651 by generating an asymmetric key pair (for example, using the known OpenPGP standard) for the write key and verify key fields of the key, and a random symmetric key is generated for the feedkey's Entry Key field. The file is then published in step 1652 using the method described above and in FIG. 16A. The subscription feedkey that corresponds to the created publication feedkey is then computed in step 1653 by removing the verify-key field from the publication feedkey. This subscription key is then published in step 1654, and the creation process is complete.

New feed entries are created and published for a feed by executing an HTTP GET request for the path corresponding to the scratch directory 344*a* containing the entry to be published, with the query parameter "op=publish". The Makyoh server will then ensure that the entry feed entry file is made available to remote servers in subdirectory 414, ensure that blob files representing all files and directories that make up the contents of the entry are made available to remote servers in subdirectory 412, import the associated hash URI(s) into the local keyring, and push the entry file and associated blobs out to known remote servers.

Figure 16D:
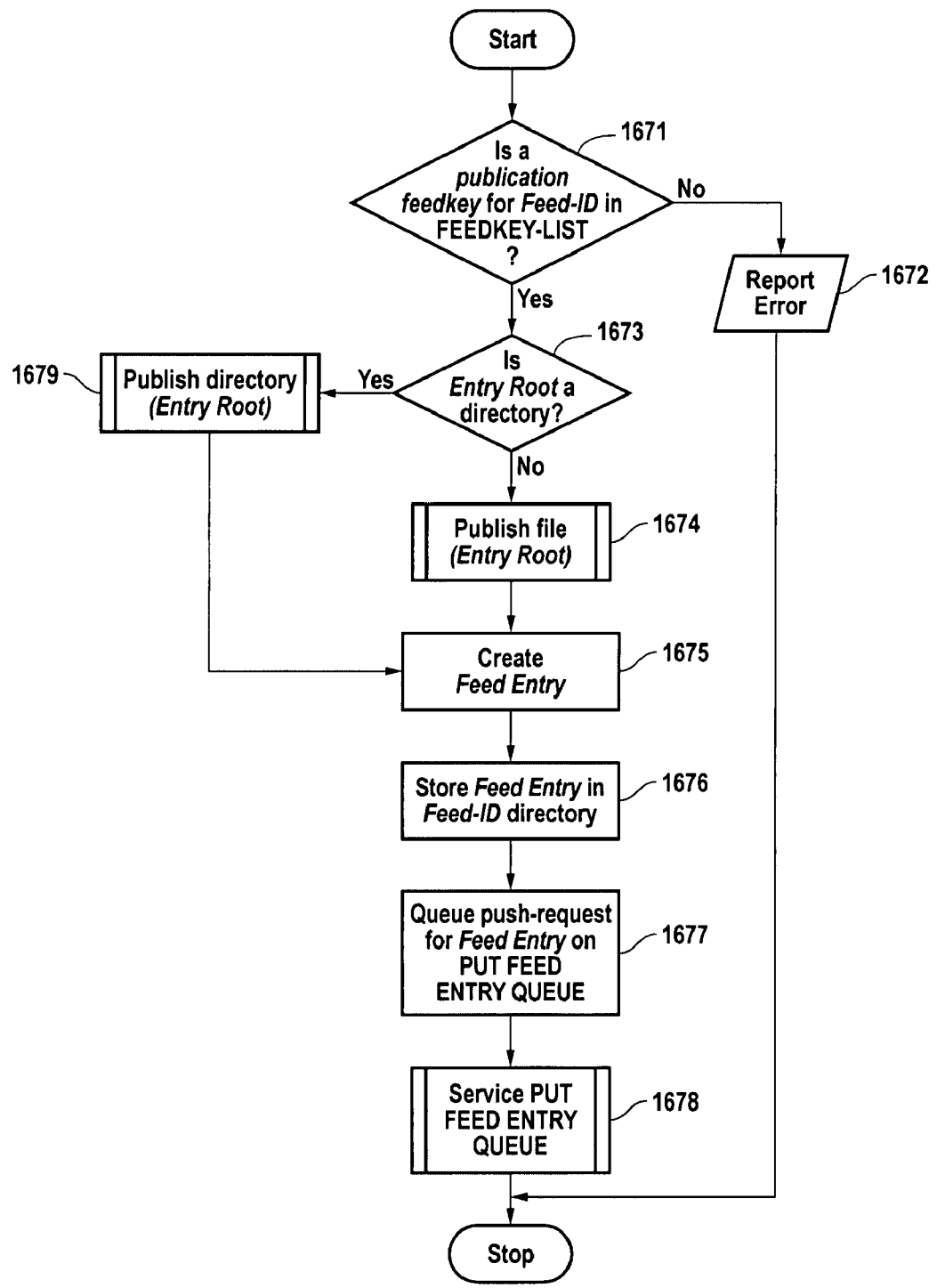
FIG. 16D illustrates the process for publishing a feed entry.

Referring to FIG. 16D, first a determination is made in step 1671 whether a publication feedkey associated with the feed-Id to be published can be found in the Feedkey List. If not, then an error is reported in step 1672, and processing is complete. If a publication feedkey is found, then another determination is made in step 1673 for whether the root of the entry (that is, the entry's main contents) is a directory. If not (i.e. if the entry consists of just a single file) then the entry's root file is published in a step 1674. The feed entry file is then created in a step 1675, using the entry key specified in the publication feedkey to encrypt the hash URI of the newly-published entry root using the write-key specified by the publication feedkey to sign the contents of the feed entry. The feed entry file is then stored in a step 1676 in the feed's subdirectory 424. A request to push the feed entry is added to the Put Feed Entry Queue in step 1677, that queue is serviced in step 1678 per FIG. 12 (this serves to distribute the received feed entry to other Makyoh servers), and processing is complete.

Returning to step 1673, if the entry root is a directory then the directory is published in step 1679, using the method described above and in FIG. 16B. The process then continues through steps 1675-1678, as described above.

VII. Robustness and Security

Makyoh is designed to protect against many kinds of attacks, many of which have already been mentioned. To summarize, Makyoh protects against the following threats:

1. Loss or theft of disk media: Because all data is encrypted on disk, the loss or theft of a hard drive or USB thumb-drive containing an archive will not reveal any information.
2. Network sniffing: All communications between Makyoh servers is encrypted, so document contents won't be revealed to someone listening in on the network.
3. Man-in-the-middle attacks: Because the request for a blob does not reveal the blob's decryption key, one cannot gain access to a set by listening to a request and then replaying it later to another server (a so-called "man-in-the-middle attack").
4. Unauthorized publication: an attacker cannot publish to a feed without the appropriate publication key. If he were to copy a signature block from a valid feed entry and attach it to his own, the signature would not match. If he instead changed the entry's verify key to his own key then the feed-Id for the entry would not match the verify key's fingerprint. In both cases, the Makyoh server receiving the feed entry would reject the file, even if the attacker knows the feed's subscription key and the receiving server does not.
5. Substitution: Because the filenames for blobs and feed entries include the file's contents hash, an attacker also can't substitute a completely new blob or feed entry in place of an existing one. The receiving server would reject the blob or feed entry as not matching the ID in its filename, even if the attacker knows the appropriate decryption key and the receiving server does not.

What is claimed is:

1. A method in a first device for distributing documents among a plurality of second devices, the first device comprising a local data store, the method in the first device comprising:

receiving, at the first device, from a user of the first device, a document retrieval request, the document retrieval request identifying a first document, wherein contents of the first document are stored in an encrypted form in a document object;

determining, by the first device, whether the document object is stored in the local data store;

if the document object is determined to be stored in the local data store, then for each second device that does not have a copy of the document object, sending the document object to said each second device in response to receiving the document retrieval request; and if the document object is determined to be not stored in the local data store, then retrieving the document object from one of the plurality of second devices, wherein the retrieving comprises:

sending a retrieve request to the plurality of second devices to retrieve a copy of the document object;

receiving the copy of the document object; and storing the copy of the document object on the local data store.

2. The method of claim 1 further comprising, subsequent to the step of storing the retrieved copy of the document object, for each second device that does not have a copy of the document object, sending a copy of the retrieved copy of the document object to said each second device.

3. The method of claim 1 wherein the first device and a first plurality of the second devices constitute members of a neighborhood, wherein the steps of sending a retrieve request and sending the document object are performed only by members of the neighborhood, wherein when a joining second device that is not already a member of the neighborhood becomes a member of the neighborhood, then subsequent thereto the steps of sending a retrieve request and sending the document object are also performed with the joining second device, wherein when a leaving second device that is already a member of the neighborhood leaves the neighborhood, then subsequent thereto the steps of sending a retrieve request and sending the document object are no longer performed with the leaving second device.

4. The method of claim 1 wherein the first device and a first plurality of the second devices collectively define a neighborhood, wherein the steps of sending a retrieve request and sending the document object are performed only by the second devices that are members of the neighborhood, the method further comprising:

detecting, by the first device, that a new second device has joined the neighborhood; and subsequent to the detection, performing, by the first device, the steps of sending a retrieve request and sending the document object only with the new second device and with the first plurality of second devices.

5. The method of claim 1 wherein the first device and a first plurality of the second devices collectively define a neighborhood, wherein the steps of sending a retrieve request and sending the document object are performed only for the second devices that are members of the neighborhood, the method further comprising:

detecting, by the first device, that a second device from the first plurality of second devices has left the neighborhood; and subsequent to the detection, performing the steps of sending a retrieve request and sending the document object only with the remaining ones of the first plurality of second devices.

6. The method of claim 1 wherein storing the retrieved copy of the document object on the local data store comprises:

computing derived data based on contents of the retrieved copy of the document object;

comparing the derived data with document information contained in the document retrieval request; and storing the retrieved copy of the document object on the local data store depending on a result of the comparison.

7. The method of claim 6 wherein the derived data is obtained by computing a hash of the contents of the retrieved copy of the document object.

8. The method of claim 1 further comprising obtaining a document key from the local data store, the document key including a decryption key for decrypting the document object.

9. The method of claim 1 wherein content of the first document in cleartext form represents a directory file, the directory file identifying a plurality of second document objects.

10. The method of claim 9 wherein, for a document object selected from among the second document objects, the method further comprises:

if the selected document object is not stored in the local data store, then retrieving the selected document object from one of the plurality of second devices including:

sending a retrieve request to the plurality of second devices to retrieve a copy of the selected document object;

storing the copy of the selected document object on the local data store; and for each second device that does not have a copy of the selected document object, sending the selected document object to said each second device.

11. The method of claim 10 further comprising decrypting the selected document object to obtain cleartext content of the selected document.

12. The method of claim 1 further comprising decrypting the document object to obtain cleartext content of the document object, wherein the cleartext content constitutes the first document.

13. The method of claim 12 further comprising presenting the cleartext content on a display device.

14. The method of claim 12 further comprising printing or faxing the cleartext content.

15. A method for distributing documents from a first device to a plurality of second devices comprising:

receiving, at the first device, from a user of the first device, information identifying a first document object;

determining, by the first device, whether the first document object is stored on a local storage device of the first device;

if it is determined that the first document object is stored on the local storage device, then for each second device that does not have a copy of the first document object, sending the first document object to said each second device in response to receiving the first document key; and if it is determined that the first document object is not stored on the local storage device, then obtaining the first document object from at least one of the plurality of second devices and storing the obtained first document object on the local storage device.

16. The method of claim 15 further comprising, subsequent storing the obtained the first document object, for each second device that does not have a copy of the first document object, sending a copy of the obtained first document object to said each second device.

17. The method of claim 15 wherein the first device and a first plurality of the second devices constitute members of a neighborhood, wherein the steps of sending a retrieve request and sending the document object are performed only for members of the neighborhood,
  wherein when a new second device that is not already a member of the neighborhood becomes a member of the neighborhood, then subsequent to the new second device becoming a member of the neighborhood the steps of sending the first document object, obtaining the first document object, and sending the obtained first document object are also performed with the new second device,
  wherein when a leaving second device that is already a member of the neighborhood leaves the neighborhood, then subsequent thereto the steps of sending the first document object, obtaining the first document object, and sending the obtained first document object are no longer performed with the leaving second device.

18. The method of claim 15 wherein the first device and a first plurality of the second devices collectively define a neighborhood, wherein the steps of sending a retrieve request and sending the document object are performed only for the second devices that are members of the neighborhood, the method further comprising:
  receiving, by the first device, notification that a new second device has joined the neighborhood; and
  subsequent to receiving the notification, performing the steps of sending the first document object, obtaining the first document object, and sending the obtained first document object only with the new second device and with the first plurality of second devices.

19. The method of claim 15 wherein the first device and a first plurality of the second devices collectively define a neighborhood, wherein the steps of sending a retrieve request and sending the document object are performed only for the second devices that are members of the neighborhood, the method further comprising:
  receiving, by the first device, a notification that one of the first plurality of second devices has left the neighborhood; and
  subsequent to receiving the notification, performing the steps of sending the first document object, obtaining the first document object, and sending the obtained first document object only with the remaining ones of the first plurality of second devices.

20. The method of claim 15 wherein the obtaining step includes:
  generating, by the first device, first derived data based on data comprising the first document key;
  sending, by the first device, a retrieve request to the plurality of second devices, the retrieve request including the first derived data, wherein the first derived data serves to identify the document object; and
  receiving, by the first device, a copy of the first document object from one of the plurality of second devices.

21. The method of claim 20 wherein the retrieve request is sent to one second device at a time.

22. The method of claim 15 further comprising decrypting the first document using a portion of the data comprising the document key to produce cleartext content of the first document object, wherein the portion of the data comprising the document key is a decryption key.

23. A method in a first device for distributing documents among a plurality of second devices, the first device comprising a local data store, the method in the first device comprising:
  receiving, by the first device, from a user of the first device, a document retrieval request to access a first document, the first document being associated with a plurality of first document objects;
  for each first document object, from among the plurality of first document objects, that is stored in the local data store:
    sending, by the first device, said each first document object to each second device, from the plurality of second devices, that does not have a copy of said each first document, the sending being done in response to receiving the document retrieval request; and
  for each first document object that is not stored in the local data store, retrieving, by the first device, said each first document object from at least one of the plurality of second devices, the retrieving including:
    sending, by the first device, a retrieve request to the plurality of second devices to retrieve a copy of said each first document object from at least one of the second devices; and
    storing the retrieved copy of said each first document object on the local data store.

24. The method of claim 23 further comprising, subsequent to the step of storing the retrieved copy of said each first document object, for each second device that does not have a copy of said each first document object, sending, by the first device, a copy of the retrieved copy of said each first document object to said each second device.

25. The method of claim 23:
  wherein the first device and a first plurality of the second devices constitute members of a neighborhood,
  wherein the steps of sending a retrieve request and sending the document object are performed only for the first plurality of the second devices,
  wherein when a joining second device that is not already a member of the neighborhood becomes a member of the neighborhood, then subsequent thereto the steps of sending a retrieve request and sending said each first document object are also performed with the joining second device,
  wherein when a leaving second device that is already a member of the neighborhood leaves the neighborhood, then subsequent thereto the steps of sending a retrieve request and sending said each first document object are no longer performed with the leaving second device.

26. A method for distributing documents from a first device to a plurality of second devices comprising:
  receiving, by the first device, a first document key, wherein data comprising the first document key identifies a first object, the first object having associated therewith a plurality of first document objects;
  for each first document object:
    if said each first document object is stored on a local storage device of the first device, then for each of the plurality of second devices that does not have a copy of said each first document object, sending said each first document object to said each of the plurality of second devices in response to receiving the first document key; and
    if said each first document object is not stored on the local storage device:
      obtaining said each first document object from at least one of the plurality of second devices; and storing said obtained each first document object on the local storage device.

27. The method of claim 26 further comprising subsequent to the step of storing said each first document object, for each second device, from among the plurality of second devices, that does not have a copy of said each first document object stored thereat, sending the obtained each first document object to said each second device.

28. The method of claim 26 wherein the first device and a first plurality of the second devices collectively define a neighborhood, wherein the steps of sending a retrieve request and sending the document object are performed only for the first plurality second devices, the method further comprising:
    receiving, by the first device, a notification indicating that a new second device has joined the neighborhood; and
    subsequent to learning of the newly joined second device receiving the notification, performing, by the first device, the steps of sending said each first document object, obtaining said each first document object, and sending the obtained said each first document object only with the new second device and with the first plurality of second devices.

29. The method of claim 26 wherein the first device and a first plurality of the second devices collectively define a neighborhood, wherein the steps of sending a retrieve request and sending the document object are performed only for the first plurality of the second devices, the method further comprising:
    detecting, by the first device, that a second device has left the neighborhood; and
    subsequent to the detecting, performing, by the first device, the steps of sending said each first document object, obtaining said each first document object, and sending the obtained said each first document object only with the remaining ones of the first plurality of second devices.

* * * * *